US009653901B2

(12) United States Patent
Miyamoto et al.

(10) Patent No.: US 9,653,901 B2
(45) Date of Patent: May 16, 2017

(54) HOLDING COMPONENT FOR VEHICLE

(71) Applicants: DAIWA KASEI INDUSTRY CO.,LTD., Aichi (JP); TOYOTA JIDOSHA KABUSHIKI KAISHA, Aichi-ken (JP)

(72) Inventors: Ryuji Miyamoto, Aichi (JP); Katsuya Hirakawa, Aichi (JP); Osamu Asai, Aichi (JP); Yusuke Akie, Aichi-ken (JP)

(73) Assignees: DAIWA KASEI INDUSTRY CO., LTD., Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/885,095

(22) Filed: Oct. 16, 2015

(65) Prior Publication Data

US 2016/0114743 A1    Apr. 28, 2016

(30) Foreign Application Priority Data

Oct. 22, 2014  (JP) .................................. 2014-215137
Aug. 4, 2015   (JP) .................................. 2015-153906

(51) Int. Cl.
*H02G 3/32* (2006.01)
*F16L 3/10* (2006.01)
(Continued)

(52) U.S. Cl.
CPC ............ *H02G 3/32* (2013.01); *B60R 16/0215* (2013.01); *F16B 21/16* (2013.01); *F16L 3/1025* (2013.01); *F16L 3/1075* (2013.01)

(58) Field of Classification Search
CPC ........ H02G 3/32; F16L 3/1025; F16L 3/1075; F16B 21/16; B60R 16/2015
(Continued)

(56) References Cited

U.S. PATENT DOCUMENTS 5,390,876 A * 2/1995 Hatano ................. F16L 3/1075
                                                        248/68.1
6,682,026 B2 * 1/2004 Nagayasu ................. F16L 3/12
                                                        248/73
(Continued)

FOREIGN PATENT DOCUMENTS

FR    2968379 A1 * 6/2012 ................. F16L 3/12
JP    09178049 A * 7/1997 ............ F16L 3/1075
(Continued)

*Primary Examiner* — Eret McNichols
(74) *Attorney, Agent, or Firm* — McClure, Qualey & Rodack, LLP

(57) ABSTRACT

In a holding component 1, for a vehicle, having: a fixing portion 10 which houses and fixedly engages with a mounting tool 101 having been moved upward through a lower opening 11H; and a holding portion 20 for holding a predetermined member 5 by an upper holding portion 21 and a lower holding portion 22 being engaged with each other, in a state where an engagement portion 23 provided in the upper holding portion 21 is housed in and engaged with an engagement housing portion 24 provided in the lower holding portion 22, a pressing portion 200 provided in the engagement portion 23 presses downward the mounting tool 101 which is engaged with and fixed to the fixing portion 10.

12 Claims, 19 Drawing Sheets

(51) Int. Cl.
*F16B 21/16* (2006.01)
*B60R 16/02* (2006.01)

(58) Field of Classification Search
USPC ............ 248/74.1, 74.2, 74.4, 67.5, 73, 65
See application file for complete search history.

(56) References Cited

U.S. PATENT DOCUMENTS

| | | | | |
|---|---|---|---|---|
| 7,661,631 | B2 * | 2/2010 | Ibaraki | F16L 3/1075 248/68.1 |
| 7,938,371 | B2 * | 5/2011 | Oga | F16L 3/1025 248/55 |
| 8,013,248 | B2 * | 9/2011 | Sakata | B60R 16/0215 174/40 CC |
| 8,979,039 | B2 * | 3/2015 | Shiga | B60R 16/0215 174/40 CC |
| 2014/0151514 | A1 * | 6/2014 | Asai | B60R 16/0215 248/74.1 |
| 2016/0121815 | A1 * | 5/2016 | Lindner | B60R 16/00 248/65 |

FOREIGN PATENT DOCUMENTS

| | | | | | |
|---|---|---|---|---|---|
| JP | 11082813 | A | * | 3/1999 | ............ F16L 3/1075 |
| JP | 2007-143309 | | | 6/2007 | |
| JP | 2007159259 | A | * | 6/2007 | ............ F16L 3/1025 |
| JP | 2011-196397 | | | 10/2011 | |
| JP | 2014108032 | A | * | 6/2014 | ......... B60R 16/0215 |
| JP | 5729225 | B2 | * | 6/2015 | ......... B60R 16/0215 |

\* cited by examiner

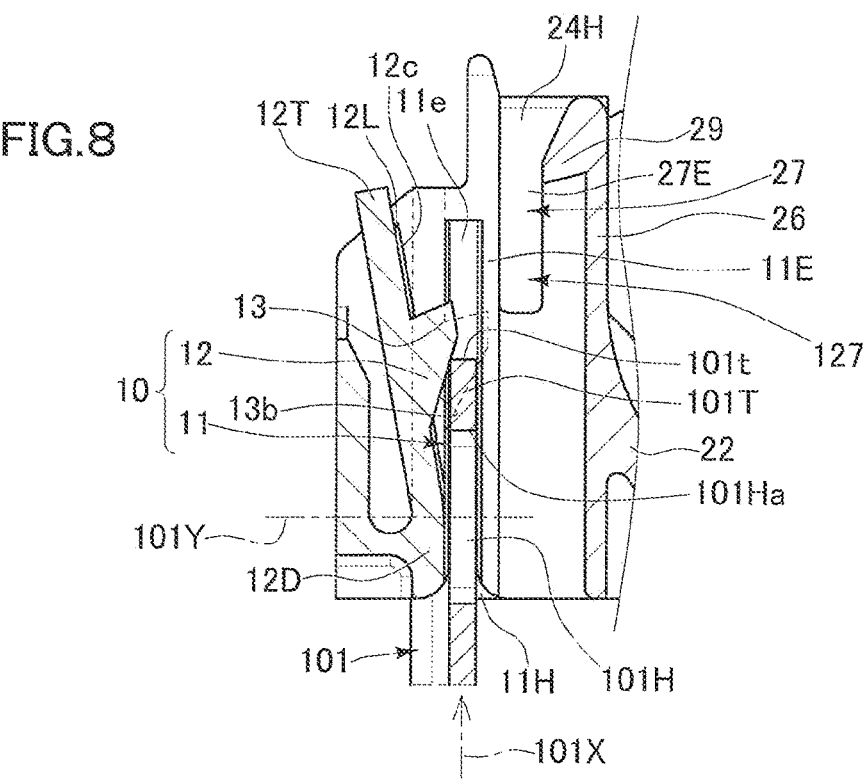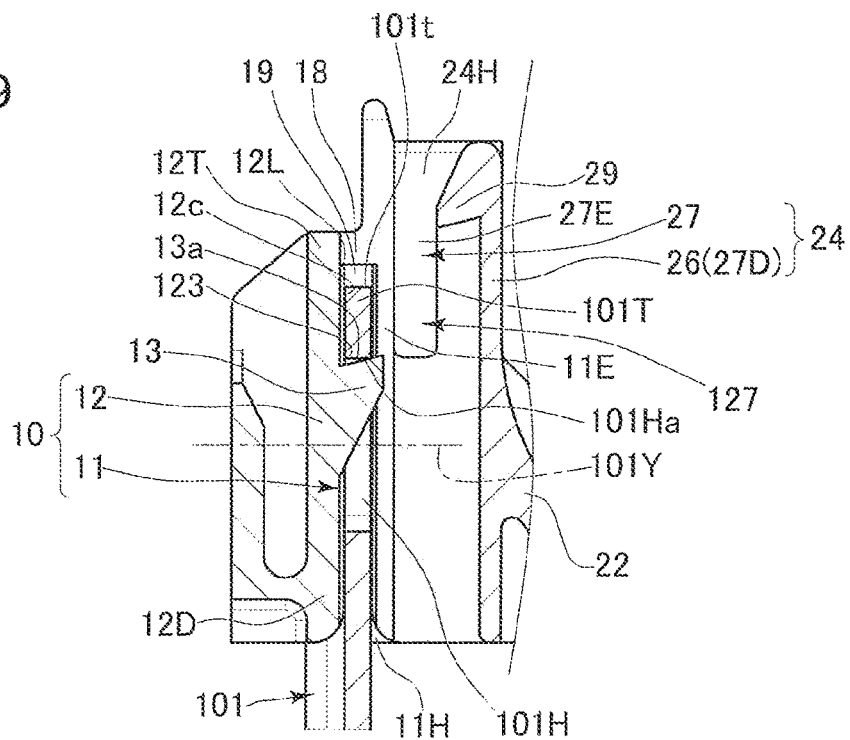

HOLDING COMPONENT FOR VEHICLE

RELATED APPLICATIONS

This application claims the priorities of Japanese Patent Application No. 2014-215137 filed on Oct. 22, 2014 and 2015-153906 filed on Aug. 4, 2015. The disclosures of the prior applications are hereby incorporated herein in the entirety by reference.

BACKGROUND OF THE INVENTION

Field of the Invention

This invention relates to a holding component, for a vehicle, which includes: a fixing portion to which a bracket for attachment to a vehicle body is fixed; and a holding portion for holding a predetermined member such that the fixing portion and the holding portion are integrated with each other.

Description of Related Art

A plurality of wiring members such as wiring harnesses to be mounted to a vehicle, are mounted to a vehicle body so as to be held by, for example, a holding component for a vehicle, such as a clamp (for example, Japanese Laid-Open Patent Publication No. 2007-143309).

Among the components for vehicles as described above, there is a component that includes: a holding portion for holding, between surface portions or the like thereof, a corrugated tube having a plurality of wiring members accommodated therein; and a fixing portion to which a bracket for attachment to a vehicle body is fixed, such that the holding portion and the fixing portion are integrated with each other. The fixing portion is formed so as to have: a housing portion for housing the bracket that has been moved upward through a lower opening; and an elastic piece having an engaging claw portion that projects inward in the housing portion. The elastic piece is formed so as to be elastically deformed such that, due to the engaging claw portion being pressed from the lower side thereof by the bracket that is moved upward in the housing portion, an upper-side portion of the elastic piece is deformed, in a direction orthogonal to the entering direction, by a lower-side portion serving as an originating point. This elastic deformation allows the bracket to be moved further upward. When the bracket has been moved further upward and an engagement hole portion of the bracket reaches a position of the engaging claw portion, the elastic piece is elastically restored by the engaging claw portion entering the engagement hole portion of the bracket. At this time, the bracket is in a removal preventing state in which the engaging claw portion having entered the engagement hole portion prevents the bracket from being removed downward, whereby the bracket is engaged with and fixed to the fixing portion.

In this structure, in the housing portion for housing the bracket having entered from the lower side, by the elastic piece being elastically deformed, the bracket needs to be moved over the engaging claw portion. Therefore, above the engaging claw portion, a space that is wider in the up-down direction than the upper end portion (a portion above the engagement hole portion) of the bracket needs to be provided. As a result, the bracket that has been engaged with and fixed to the fixing portion is movable upward/downward in the wider space, whereby instability in the bracket may occur.

An object of this invention is to reduce, in a holding member which includes: a housing portion to which a bracket is fixed; and a holding portion for detachably holding a predetermined member such that the housing portion and the holding portion are integrated with each other, instability in the bracket having been fixed.

SUMMARY OF THE INVENTION

In order to solve the aforementioned problem, a holding component for a vehicle according to this invention is a holding component, for a vehicle, including: a fixing portion to which a mounting tool to be mounted to a vehicle body is fixed; and a holding portion for detachably holding a predetermined member, in which the fixing portion includes
a mounting tool housing portion configured to house the mounting tool that has been moved upward through a lower opening, and
an elastic portion configured: to have, on an upper-side portion, an engaging claw portion that projects inward in the mounting tool housing portion such that the engaging claw portion is pressed from thereunder by the mounting tool entering so as to be moved upward through the lower opening; to allow the mounting tool to be moved further upward by the elastic portion being elastically deformed by a lower-side portion serving as an originating point due to the engaging claw portion being pressed; and to allow the engaging claw portion to enter an engagement hole portion of the mounting tool by the elastic portion being elastically restored when the mounting tool is moved further upward and the engagement hole portion of the mounting tool reaches a position of the engaging claw portion, to provide a first engaging state in which the engaging claw portion having entered contacts with an inner peripheral upper surface of the engagement hole portion to prevent the mounting tool from being removed downward, and the holding portion includes: an upper holding portion disposed above the predetermined member; a lower holding portion disposed below the predetermined member; an engagement portion provided in the upper holding portion; an engagement receiving portion, provided in the lower holding portion, configured to provide a second engaging state in which the engagement receiving portion engages with the engagement portion to combine the upper holding portion and the lower holding portion with each other; and a pressing portion configured to press the mounting tool in the first engaging state downward under the second engaging state, and hold the engaging claw portion in such a state that the engaging claw portion contacts with the inner peripheral upper surface of the engagement hole portion.

In a configuration of the holding component for a vehicle according to this invention, the mounting tool (bracket) that is moved upward from the lower side to enter the mounting tool housing portion, and that is prevented from being removed downward, in the fixing portion, can be held so as to be pressed downward by the pressing portion that enters the engagement receiving portion in the holding portion from the upper side. Thus, instability in the mounting tool can be reduced.

In the configuration of this invention, the engagement receiving portion may be provided in an engagement housing portion, of the lower holding portion, adjacent to the mounting tool housing portion, and the engagement receiving portion may be configured to engage with the engagement portion that is moved downward through an upper opening of the engagement housing portion, and housed, to provide the second engaging state, and the pressing portion may be provided in the engagement portion, and may be configured to press downward the mounting tool in the first engaging state according to the second engaging state being obtained. In this configuration, since the pressing portion is provided in the engagement portion, simultaneously when the engaging and combining operation for obtaining the second engaging state by the engagement portion being moved downward is completed, the operation for pressing the mounting tool downward by the pressing portion can be completed. That is, the engaging and combining operation for obtaining the second engaging state, and the operation for pressing the mounting tool downward are completed by one operation for pressing the engagement portion downward, whereby the operation can be efficiently performed. Further, an internal space of the mounting tool housing portion and an internal space of the engagement housing portion may be configured to communicate with each other, and the elastic portion forming a wall portion of the mounting tool housing portion may be positioned on a first side in a direction orthogonal to an entering direction, and a wall portion of the engagement housing portion in which the engagement receiving portion is formed may be positioned on a second side so as to oppose the elastic portion. In this configuration, the mounting tool housing portion and the engagement housing portion are not separated from each other by, for example, a wall portion. Therefore, the pressing portion of the engagement portion which has entered the engagement housing portion can enter the mounting tool housing portion in a simplified manner. No wall portion or the like that divides a space is provided. Therefore, the holding component for a vehicle according to this invention can be also effectively reduced in size. Further, the pressing portion may be configured as an elastic piece that extends diagonally upward from a lower end of the engagement portion in a direction opposite to a direction in which the engaging claw portion of the elastic portion projects, and, when the pressing portion presses the mounting tool in the first engaging state downward under the second engaging state, the pressing portion may be configured to be elastically deformed such that an end side portion thereof is pressed in the direction in which the engaging claw portion projects. In this configuration, since the shape of the pressing portion can be simplified, reduction of instability which is an object of this invention can be attained by minor change being made on conventional products having no pressing portions.

Further, in the configuration of this invention, the pressing portion may be provided in the upper holding portion at a position other than positions in the engagement portion, and the pressing portion may be moved downward through an upper opening of the mounting tool housing portion to enter the mounting tool housing portion when the second engaging state is to be obtained, and the pressing portion may press the mounting tool in the first engaging state downward when the second engaging state is obtained. Also in this configuration, simultaneously when the engaging and combining operation for obtaining the second engaging state by the engagement portion being moved downward is completed, the operation for pressing the mounting tool downward by the pressing portion can be completed. Therefore, the operation can be efficiently performed.

BRIEF DESCRIPTION OF THE DRAWINGS

FIG. 8 illustrates, in the cross-section taken along the line VI-VI in FIG. 2, a second step of the process in which the mounting tool shown in FIG. 1 is housed so as to be fixed;

FIG. 9 illustrates, in the cross-section taken along the line VI-VI in FIG. 2, a first engaging state in which the mounting tool shown in FIG. 1 is fixed;

DESCRIPTION OF THE PREFERRED EMBODIMENTS

Figure 1:
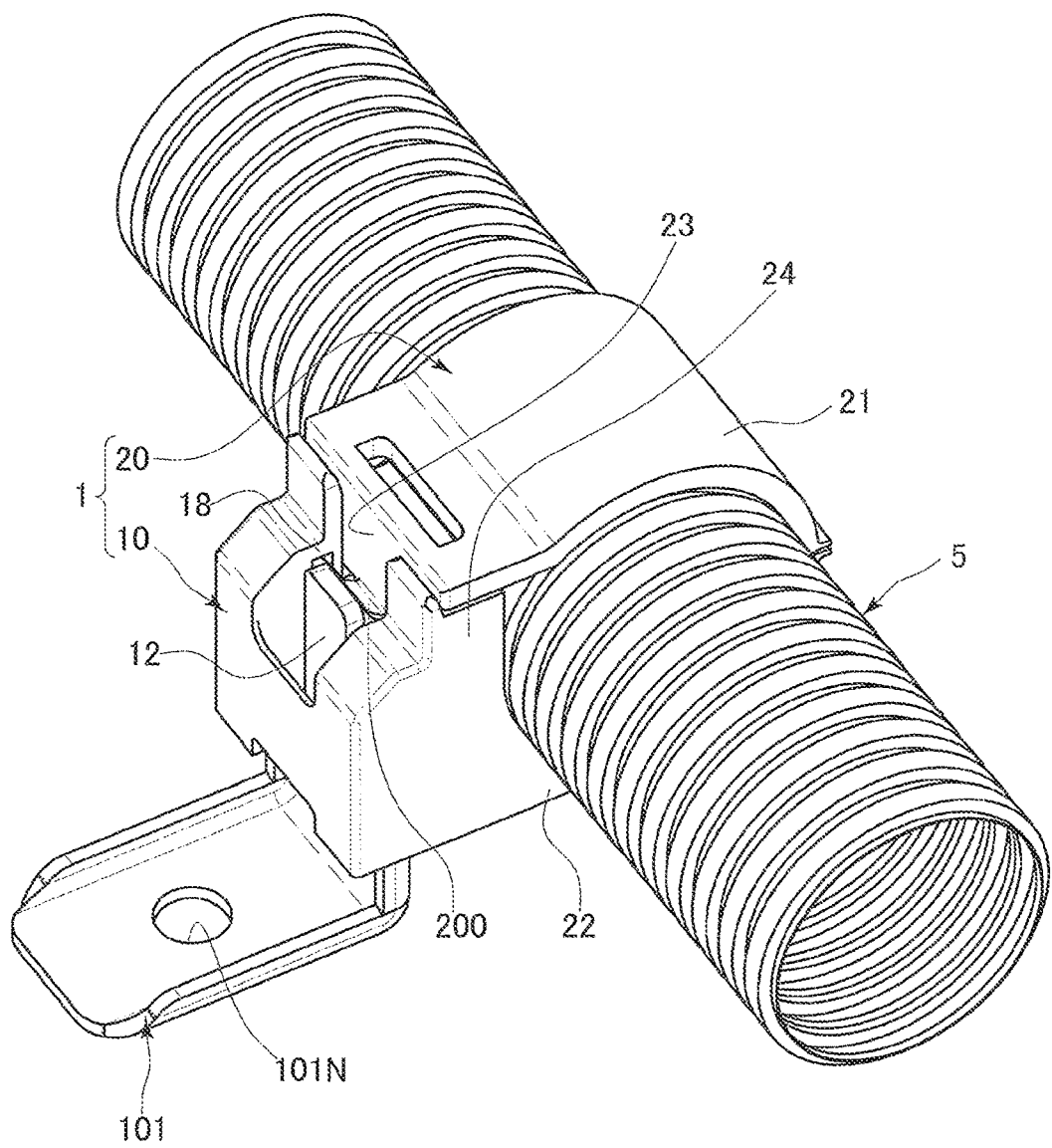
FIG. 1 is a perspective view illustrating a state where a predetermined member is held by a holding component for a vehicle according to a first embodiment of this invention.
Figure 2:
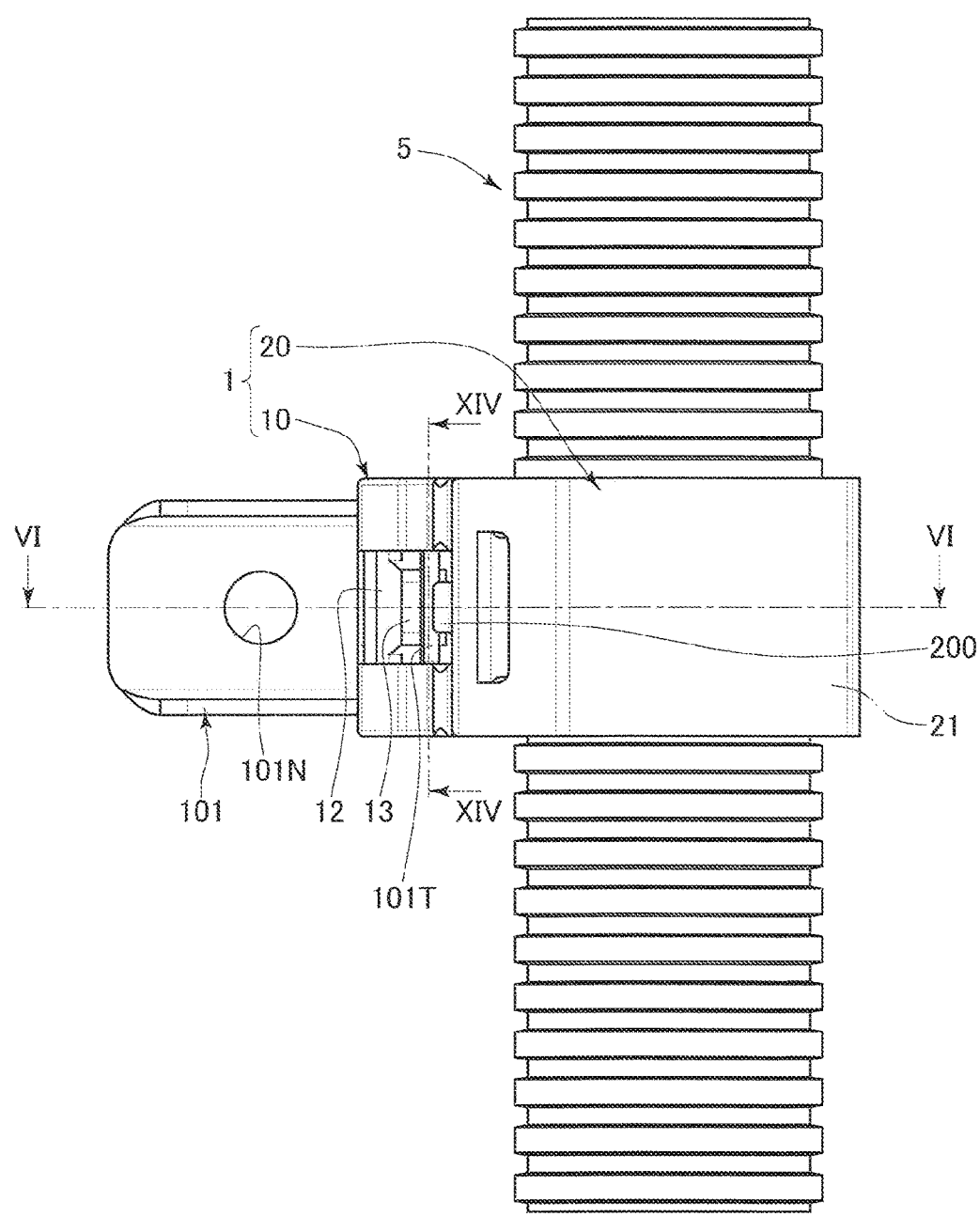
FIG. 2 is a plan view illustrating the state shown in FIG. 1.

Embodiments of this invention will be described below with reference to the drawings.

As shown in FIG. 1 to FIG. 4, a holding component 1 for a vehicle according to this embodiment includes: a fixing portion 10 to which a mounting tool (bracket) 101 to be mounted to a vehicle body 100 (see FIG. 3) is fixed; and a holding portion 20 for detachably holding a predetermined member 5 such that the fixing portion 10 and the holding portion 20 are integrated with each other. The predetermined member 5 of this embodiment is a corrugated tube, and one or more wiring harnesses (not shown) are accommodated therein.

The predetermined member 5 of this invention may be another member. For example, the predetermined member 5 may be another wiring member such as a wiring harness bundle including a plurality of wiring harnesses.

Figure 5:
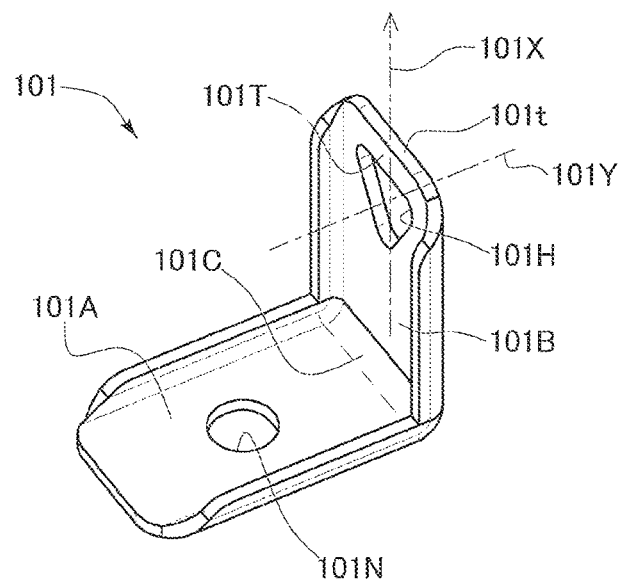
FIG. 5 is a perspective view of a mounting tool shown in FIG. 1.

The mounting tool 101 of this embodiment is a plate-like member that is bent so as to be L-shaped, as shown in FIG. 5. A first side extending portion 101A extends toward a first side from a bent portion 101C, and has a through hole portion 101N into which fastening members 102B, 102N (see FIG. 3) are inserted so as to fasten and fix the mounting tool 101 to the vehicle body 100. A second side extending portion 101B extends from the bent portion 101C toward a second side different from the first side, and has an engagement hole portion 101H with which an engaging claw portion 13 described below engages.

Figure 3:
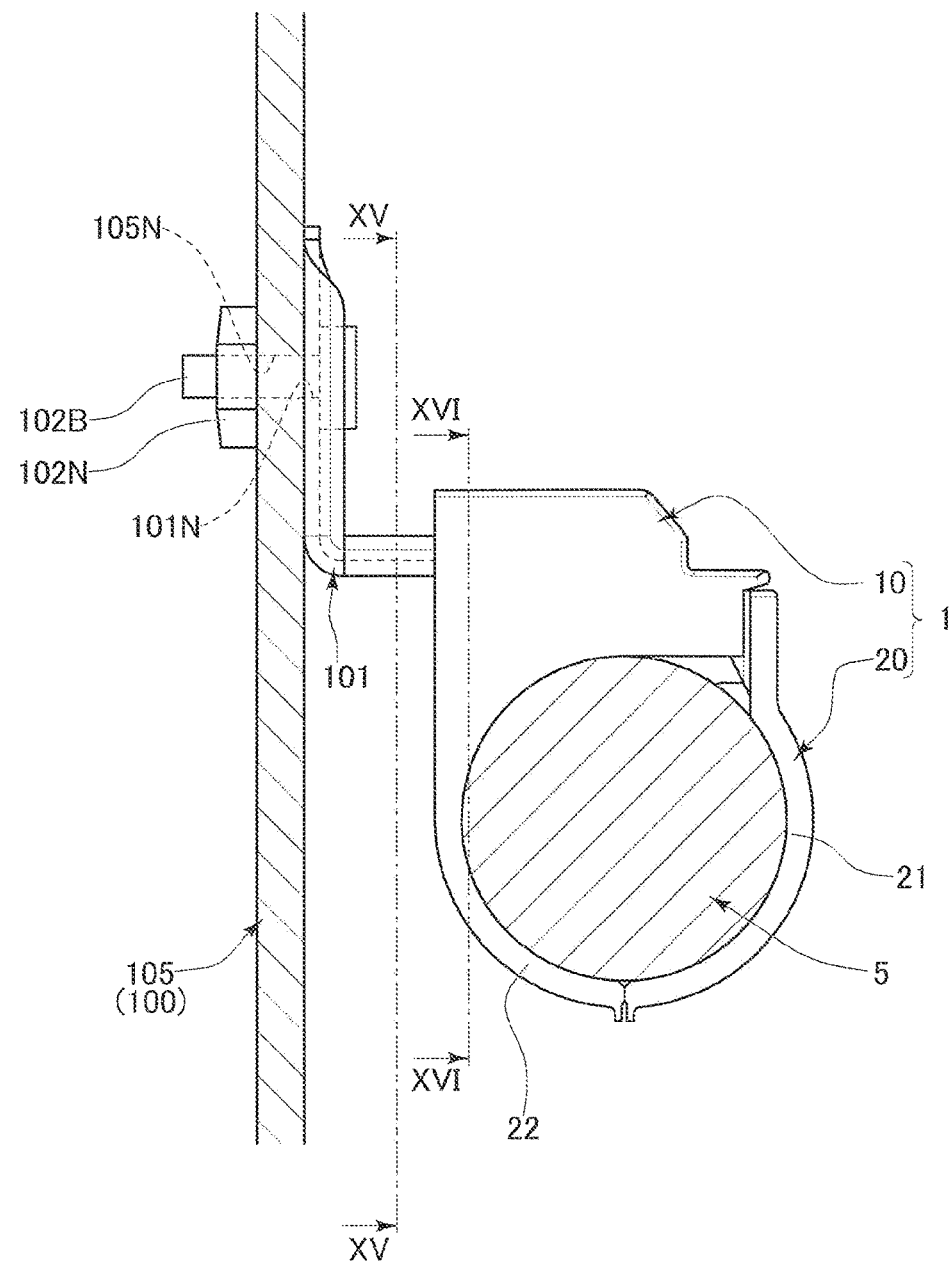
FIG. 3 is a front view illustrating a state where the holding component, shown in FIG. 1, for a vehicle is mounted to a vehicle body.

The fastening members 102B, 102N of this embodiment are implemented as a bolt 102B and a nut 102N. As shown in FIG. 3, the bolt 102B is disposed so as to pass, from the mounting tool 101 side, through the through hole portion 101N of the mounting tool 101 and a through hole portion 105N of a panel 105 of the vehicle body 100, and the bolt 102B is screwed and fastened into the nut 102N at the panel 105 of the vehicle body 100. However, this is merely an exemplary manner, and the mounting tool 101 may be fixed to the vehicle body 100 in another manner. A shape of the mounting tool 101 to be fixed to the vehicle body 100 may be another shape.

Further, the engagement hole portion 101H of this embodiment is a through hole that penetrates through the mounting tool 101 in its plate thickness direction. However, the engagement hole portion 101H may have any shape that allows engagement with the engaging claw portion 13 described below, and the engagement hole portion 101H may be implemented as, for example, a recess that is recessed in the plate thickness direction.

The fixing portion 10 is formed as a first engagement housing portion 10 that provides a first engaging state in which the mounting tool 101 having been moved upward through a lower opening 11H is housed therein, and the mounting tool 101 housed therein is prevented from being removed downward, as shown in FIG. 6 to FIG. 9.

Figure 6:
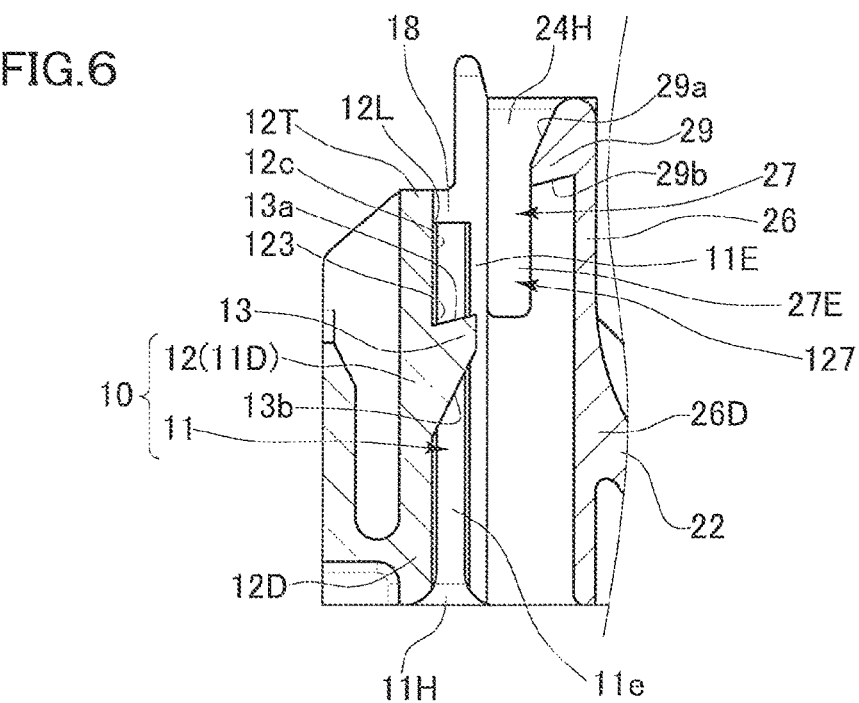
FIG. 6 illustrates, in a cross-section taken along a line VI-VI in FIG. 2, a state where the mounting tool shown in FIG. 1 is not fixed.

The first engagement housing portion 10 has: a housing portion (mounting tool housing portion) 11 for housing the mounting tool 101 that has been moved upward through the lower opening 11H; and an elastic portion 12 having the engaging claw portion 13 that projects inward in the housing portion 11, as shown in FIG. 6. The elastic portion 12 of this embodiment is a plate-like wall portion that is formed as a part of a wall portion 11D forming the housing portion 11 and that extends in the up-down direction. The elastic portion 12 is connected to a connection portion 12D of the housing portion 11, and is elastically deformable such that an upper side portion thereof swings by the connection portion 12D serving as an originating point (see FIG. 8). The first engagement housing portion 10 of this embodiment has the wall portion 11D forming the elastic portion 12, and guiding wall portions 11E, 11E (see FIG. 4) that form the housing portion 11 and have guiding grooves 11e. The guiding grooves 11e are fitted to both end portions, respectively, in the width direction, of the mounting tool 101, and allow the mounting tool 101 to slide in an entering direction 101X, thereby guiding entering of the mounting tool 101 when the mounting tool 101 is housed. The wall portion 11D and the guiding wall portions 11E, 11E are configured to form the lower opening 11H.

Figure 7:
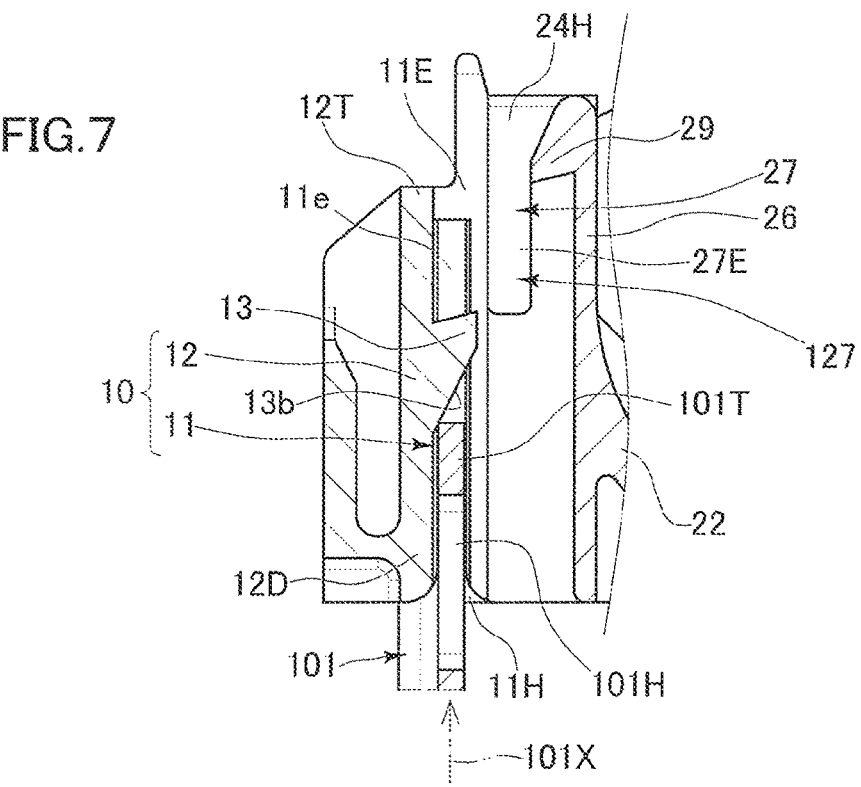
FIG. 7 illustrates, in the cross-section taken along the line VI-VI in FIG. 2, a first step of a process in which the mounting tool shown in FIG. 1 is housed so as to be fixed.

The elastic portion 12 has, on its upper side, the engaging claw portion 13 that is pressed upward from the lower side by the mounting tool 101 which is moved in the upward direction (the entering direction 101X) in the housing portion 11 as shown in FIG. 7. That is, the engaging claw portion 13 is disposed so as to contact with the mounting tool 101 that enters from the lower side, and prevents the mounting tool 101 having entered through the lower opening 11H from being moved upward.

However, when the pressing force is increased, the elastic portion 12 is elastically deformed, in a direction orthogonal to the entering direction 101X of the mounting tool 101 having entered, by the lower-side portion thereof (the connection portion 12D) serving as the originating point, as shown in FIG. 8. Specifically, a lower surface 13b of the engaging claw portion 13 is formed as a tilted surface in which a projecting base end side is the lower side, and a projecting end side is the upper side. The lower surface 13b is pressed upward by an upper end portion 101T of the mounting tool 101 having entered, whereby an upper side portion (an upper end portion 12T), of the elastic portion 12, having the engaging claw portion 13, is urged so as to be elastically deformed in a direction opposite to the projecting direction of the engaging claw portion 13 by the lower-side portion serving as the originating point.

The mounting tool 101 that has thus entered so as to elastically deform the elastic portion 12 can be moved further upward. Then, the elastic portion 12 is elastically restored, whereby the mounting tool 101 that has been moved further upward is brought into the first engaging state in which the mounting tool 101 is prevented from being removed downward, as shown in FIG. 9. That is, in a state where the mounting tool 101 has entered the housing portion 11, the mounting tool 101 has the engagement hole portion 101H formed so as to penetrate in a direction 101Y orthogonal to the entering direction 101X, as shown in FIG. 5, and when the engagement hole portion 101H of the mounting tool 101 has reached a position of the engaging claw portion 13, the engaging claw portion 13 enters the engagement hole portion 101H, whereby the elastic portion 12 is elastically restored, as shown in FIG. 9. The engaging claw portion 13 that has entered the engagement hole portion 101H opposes an inner peripheral upper surface 101Ha of the engagement hole portion 101H in the entering direction 101X of the mounting tool 101. When the mounting tool 101 is moved in a direction opposite to the entering direction 101X, the engaging claw portion 13 contacts with (stops in an engaging manner on) the inner peripheral upper surface (engaging surface) 101Ha to prevent the movement of the mounting tool 101. This state is the first engaging state in which the mounting tool 101 is prevented from being removed downward.

Figure 4:
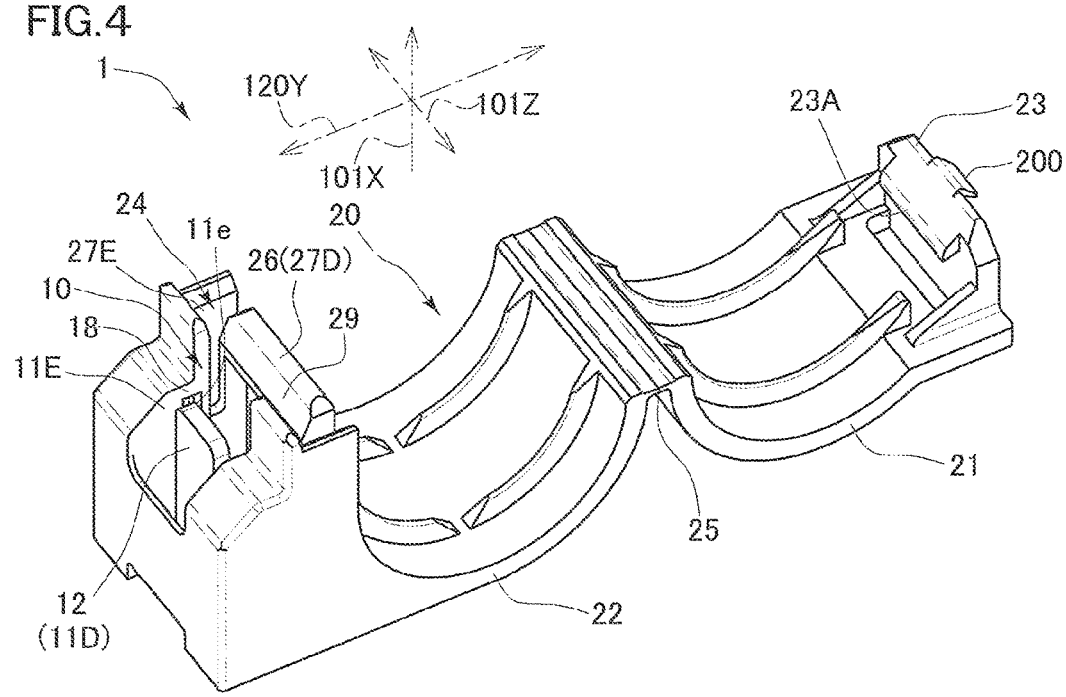
FIG. 4 is a perspective view illustrating a state where a holding portion in the holding component, shown in FIG. 1, for a vehicle does not hold the predetermined member.

Meanwhile, the holding portion 20 includes an upper holding portion 21, a lower holding portion 22, an engagement portion 23, and a second engagement housing portion 24, as shown in FIG. 3 and FIG. 4. The upper holding portion 21 is disposed above the corrugated tube 5 to be held. The lower holding portion 22 is disposed below the corrugated tube 5. The engagement portion 23 is provided on the fixing portion 10 side of the upper holding portion 21. The second engagement housing portion 24 is provided on the fixing portion 10 side of the lower holding portion 22 so as to be adjacent to the housing portion 11 of the fixing portion 10. The second engagement housing portion 24 provides a second engaging state in which the engagement portion 23 having been moved downward through an upper opening 24H (see FIG. 11) is housed, and the engagement portion 23 having been housed is prevented from being removed upward.

In this embodiment, the upper holding portion 21 and the lower holding portion 22 are coupled to each other via a hinge portion 25. Further, on the side opposite to the hinge portion 25 side, the engagement portion 23 of the upper holding portion 21 and the second engagement housing portion 24 of the lower holding portion 22 are detachably engaged with each other. The upper holding portion 21 and the lower holding portion 22 in the engaging state (the second engaging state), are disposed so as to annularly surround an outer circumference of the corrugated tube 5, to hold therebetween the corrugated tube 5 having been disposed, in the up-down direction, as shown in FIG. 3.

The upper holding portion 21 and the lower holding portion 22 may be separated from each other. For example, when the upper holding portion 21 is implemented as an upper casing portion, and the lower holding portion 22 is implemented as a lower casing portion, the upper casing portion 21 and the lower casing portion 22 may be engaged with and fixed to each other in the up-down direction to form a casing body, and the predetermined member 5 may be held so as to be housed in the casing body. In this case, an engagement portion that allows the upper casing portion 21 and the lower casing portion 22 to engage with each other may be provided, as appropriate, on, for example, a side opposite to the engagement portion 23 side, in addition to the engagement portion 23.

Figure 11:
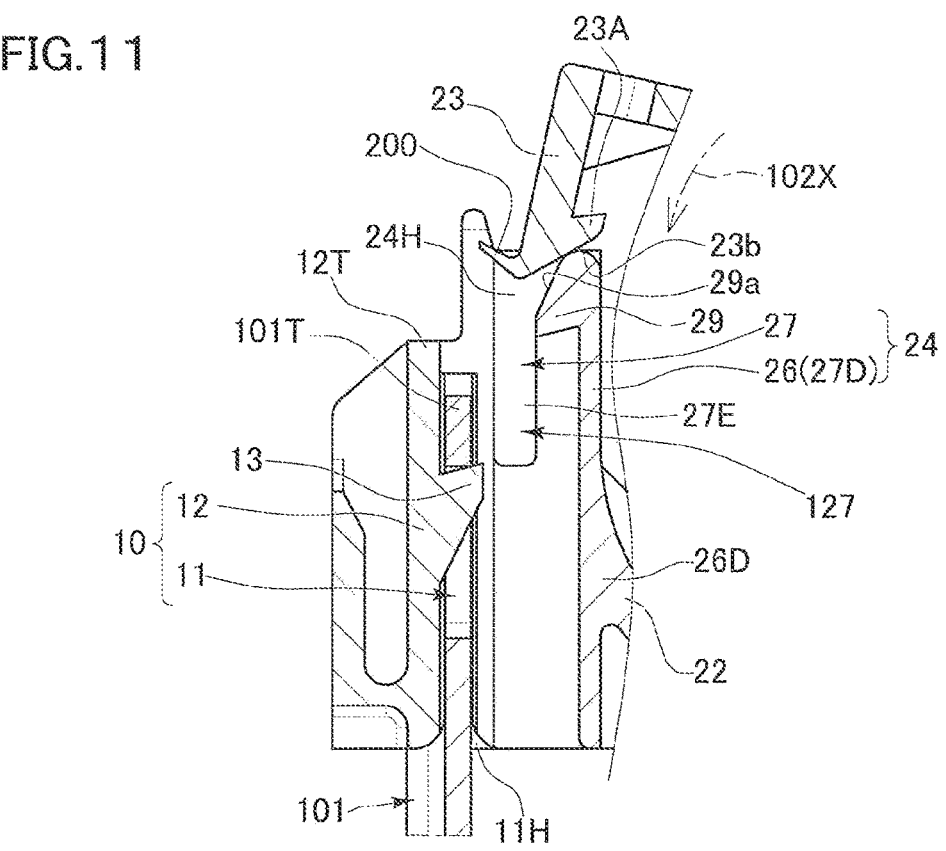
FIG. 11 illustrates, in the cross-section taken along the line VI-VI in FIG. 2, a first step of a process in which the engagement portion is housed so as to be fixed at the holding portion in the first engaging state shown in FIG. 9.

The second engagement housing portion 24 includes a housing portion 27 and an elastic portion 26, as shown in FIG. 9 and FIG. 11. The housing portion 27 is configured to house the engagement portion 23 that has been moved downward through the upper opening 24H. The elastic portion 26 has an engaging claw portion (engagement receiving portion) 29 that projects inward in the housing portion 27. The elastic portion 26 of this embodiment is a plate-like wall portion that is formed as a part of a wall portion 27D forming the housing portion 27, and that extends in the up-down direction. The elastic portion 26 is connected to a connection portion 26D corresponding to a lower-side end portion of the housing portion 27, and is elastically deformable such that an upper side portion thereof swings by the connection portion 26D serving as an originating point (see FIG. 12). The second engagement housing portion 24 of this embodiment includes: the wall portion 27D forming the elastic portion 26; and side wall portions 27E, 27E, on both ends in the width direction of the engagement portion 23, forming the housing portion 27, such that the wall portion 27D and the side wall portions 27E, 27E form the upper opening 24H (see FIG. 4).

In this embodiment, the housing portion 27 is also connected to the lower holding portion 22 at the connection portion 26D.

The elastic portion 26 has, on its upper side, the engaging claw portion 29 that is pressed downward from the upper side by the engagement portion 23 which is moved in the lower direction (an entering direction 102X) in the housing portion 27, as shown in FIG. 11. That is, the engaging claw portion 29 is disposed so as to contact with the engagement portion 23 that enters from the upper side, and prevents the engagement portion 23 having entered through the upper opening 24H from being moved downward.

Figure 10:
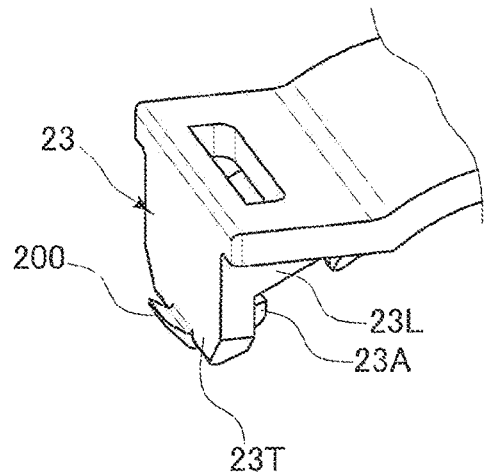
FIG. 10 is a perspective view of an engagement portion of the holding portion shown in FIG. 1.

Meanwhile, the engagement portion 23 has, on its lower side (in this embodiment, lower end portion 23T: see FIG. 10), an engaging claw portion 23A that projects toward the elastic portion 26 so as to press downward the engaging claw portion 29 of the elastic portion 26 when the engagement portion 23 enters through the upper opening 24H. When the engagement portion 23 is moved in the lower direction (the entering direction 102X) in the housing portion 27, the engaging claw portion 23A presses the engaging claw portion 29 of the elastic portion 26 downward from the upper side.

Entering of the engagement portion 23 into the housing portion 27 is a movement through the upper opening 24H in the entering direction 102X. To be accurate, this movement is a movement through the upper opening 24H in the entering direction 102X in such a manner as to form an arc-shaped trajectory in which the hinge portion 25 is the center thereof.

Figure 12:
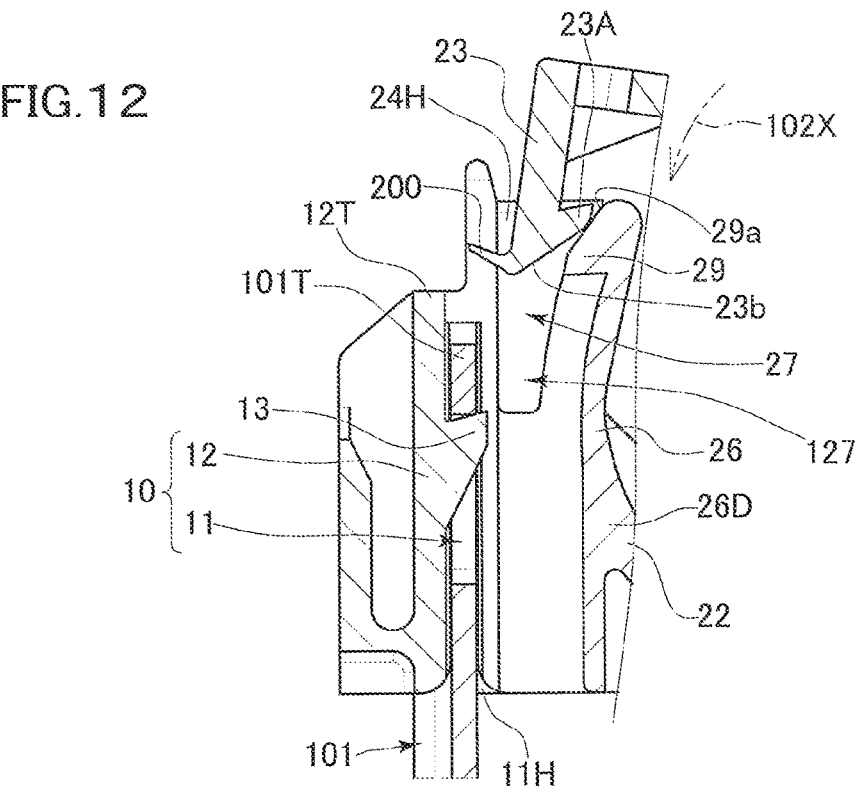
FIG. 12 illustrates, in the cross-section taken along the line VI-VI in FIG. 2, a second step of the process in which the engagement portion is housed so as to be fixed at the holding portion in the first engaging state shown in FIG. 9.

As shown in FIG. 12, when a pressing force by the engagement portion 23 shown in FIG. 11 is increased, the elastic portion 26 is elastically deformed in a direction orthogonal to the entering direction 102X of the engagement portion 23 having entered, by its lower-side portion (the connection portion 26D) servicing as the originating point. Specifically, an upper surface 29a of the engaging claw portion 29 is formed as a titled surface in which a projecting base end side is the upper side, and a projecting end side is the lower side. The upper surface 29a is pressed downward by the lower end portion 23T (engaging claw portion 23A) of the engagement portion 23 having entered, whereby the upper-side portion, of the elastic portion 26, having the engaging claw portion 29 is urged so as to be elastically deformed in a direction opposite to the projecting direction of the engaging claw portion 29 by its lower-side portion serving as an originating point. Further, the engaging claw portion 23A also has a lower surface 23b formed as a tilted surface in which a projecting base end side is the lower side, and a projecting end side is the upper side. The engaging claw portion 29 of the elastic portion 26 is pressed downward by the lower surface 23b when the engagement portion 23 enters the housing portion 27 through the upper opening 24H, whereby the upper-side portion, of the elastic portion 26, having the engaging claw portion 29 is urged so as to be elastically deformed in a direction opposite to the projecting direction of the engaging claw portion 29 by the lower-side portion serving as an originating point.

Figure 13:
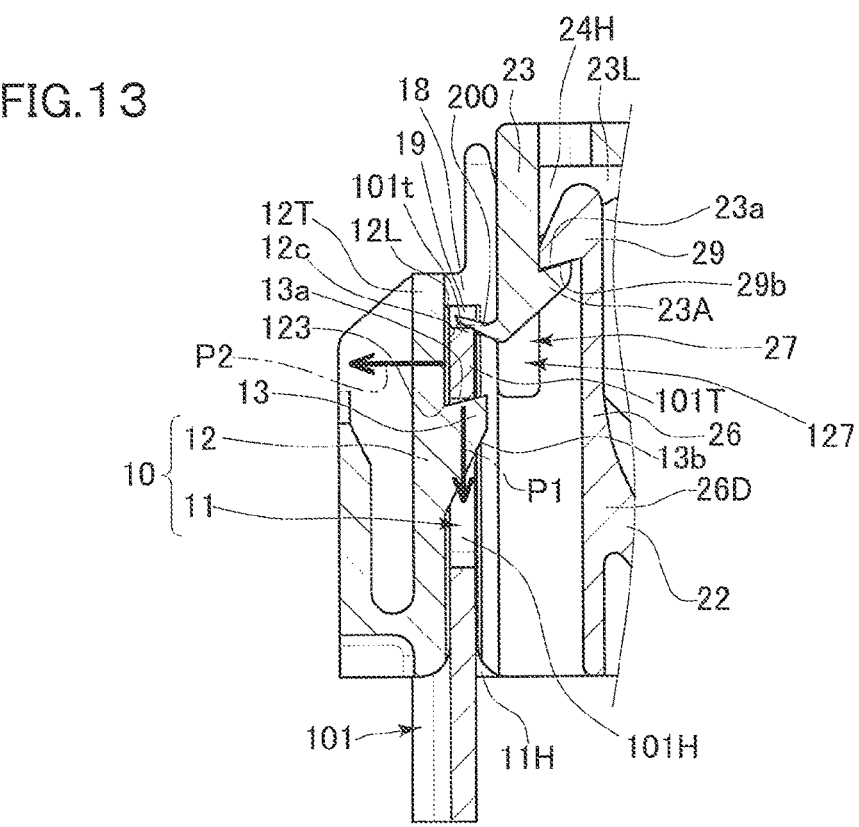
FIG. 13 illustrates, in the cross-section taken along the line VI-VI in FIG. 2, a second engaging state in which the engagement portion is fixed at the holding portion in the first engaging state shown in FIG. 9.

The engagement portion 23 that has thus entered so as to elastically deform the elastic portion 26 can be moved further downward. The engagement portion 23 that has been moved further downward is brought into the second engaging state in which the engagement portion 23 is prevented from being removed upward, by the elastic portion 26 being elastically restored as shown in FIG. 13. That is, while the engagement portion 23 is positioned so as to oppose the elastic portion 26 in the direction orthogonal to the entering direction 102X in a state where the engagement portion 23 has entered the housing portion 27 shown in FIG. 13, since the engaging claw portion 23A of the engagement portion 23 and the engaging claw portion 29 of the elastic portion 26 project so as to be close to each other, the engaging claw portions 29 and 23A contact with each other to prevent the engagement portion 23 from entering when the engagement portion 23 enters the housing portion 27 as shown in FIG. 11. After the engaging claw portion 23A of the engagement portion 23 has been elastically moved over the engaging claw portion 29 of the elastic portion 26, the engaging claw portion 23A of the engagement portion 23 is moved to under the engaging claw portion 29 of the elastic portion 26, as shown in FIG. 13, whereby the elastic portion 26 is elastically restored. The engaging claw portion 23A (an upper surface 23a) of the engagement portion 23 which has been moved to under the engaging claw portion 29 of the elastic portion 26, opposes the engaging claw portion 29 (a lower surface 29b) of the elastic portion 26 in the up-down direction (the entering direction 102X). When the engagement portion 23 is moved in a direction opposite to the entering direction 102X, the engaging claw portion 23A contacts with (stops in an engaging manner on) the lower surface (engaging surface) 29b of the engaging claw portion 29, to prevent movement of the engagement portion 23. This state is the second engaging state in which the engagement portion 23 is prevented from being removed upward.

Further, the holding portion 20 has a pressing portion 200 as shown in FIG. 13. Under the second engaging state, the pressing portion 200 presses downward the mounting tool 101 that is in the first engaging state, and the engaging claw portion 13 in the housing portion 11 is maintained so as to be in contact with the inner peripheral upper surface 101Ha (see FIG. 9) of the engagement hole portion 101H of the mounting tool 101.

The pressing portion 200 of this embodiment is provided in the engagement portion 23. Specifically, as shown in FIG. 13, the pressing portion 200 of this embodiment is an elastic piece that extends diagonally upward from the lower end of the engagement portion 23 in a direction opposite to a direction in which the engaging claw portion 23A projects, so as to be oriented in a direction opposite to a direction in which the engaging claw portion 13 of the elastic portion 12 is oriented, and that has an end (upper end) portion which is elastically deformable so as to be close to the engagement portion 23 by its base end side portion connected to the lower end portion 23T (see FIG. 10) of the engagement portion 23 serving as an originating point. The engagement portion 23 enters the second engagement housing portion 24 (housing portion 27), and the engaging claw portion 23A is moved over the engaging claw portion 29 to be brought into the second engaging state, whereby the pressing portion 200 contacts, from the upper side, with the upper end portion 101T (an upper end surface 101t) of the mounting tool 101 that is in the first engaging state. When the second engaging state has been obtained, the pressing portion 200 is brought into an elastically deformed state in which the pressing portion 200 presses the mounting tool 101 downward while the end portion of the pressing portion 200 is pressed upward by the mounting tool 101.

At this time, the mounting tool 101 is pressed, by the pressing portion 200, in both a lower direction P1 and an opposite direction (P2) to the projecting direction of the engaging claw portion 13, and the mounting tool 101 is accommodated in a corner portion 123 formed by the upper end portion 12T and the engaging claw portion 13 of the elastic portion 12. In this state, the mounting tool 101 contacts with both (two surfaces) of an inner wall surface 12c (an end surface of a rib 12L that extends in the up-down direction: see FIG. 15 and FIG. 16) of the upper end portion 12T of the elastic portion 12, and an upper surface 13a of the engaging claw portion 13. Thus, the mounting tool 101 is stabilized without instability in the mounting tool 101 in both the up-down direction and the inward-outward direction orthogonal to the up-down direction.

The engagement portion 23 has such a bent shape that the engagement portion 23 extends from the upper holding portion 21 toward the fixing portion 10, and is bent downward at the end of the extension, as shown in FIG. 13. The engagement portion 23 is formed, by a rib 23L (see FIG. 10) that provides reinforcement for enhancing rigidity of the bent shape, into a shape which is less likely to be elastically deformed so as to change a bending angle of the bent shape. Therefore, when the engagement portion 23 is moved and housed into the housing portion 27, the elastic portion 26 is mainly deformed elastically, and elastic deformation of the engagement portion 23 that is L-shaped hardly occurs.

Further, in this embodiment, a housing space of the housing portion 11 and a housing space of the housing portion 27 communicate with each other, to form one common space 127. That is, the elastic portion 12 that forms a part of the wall portion 11D of the housing portion 11 is disposed on the first side in a direction orthogonal to the entering direction 101X of the mounting tool 101, and the elastic portion 26 forming a part of the wall portion 27D (see FIG. 15) of the housing portion 27 is disposed on the second side. The space 127 is formed between both the elastic portions 12 and 26 opposing each other. A wall portion or the like that separates the housing space of the housing portion 11 and the housing space of the housing portion 27 from each other is not provided, whereby the size of the holding component 1 for a vehicle can be reduced. Further, the housing portion 11 and the second engagement housing portion 24 (housing portion 27) are not separated by a wall portion or the like, whereby the pressing portion 200 of the engagement portion 23 can be moved into the housing portion 11 in a simplified manner to press the mounting tool 101.

Figure 14:
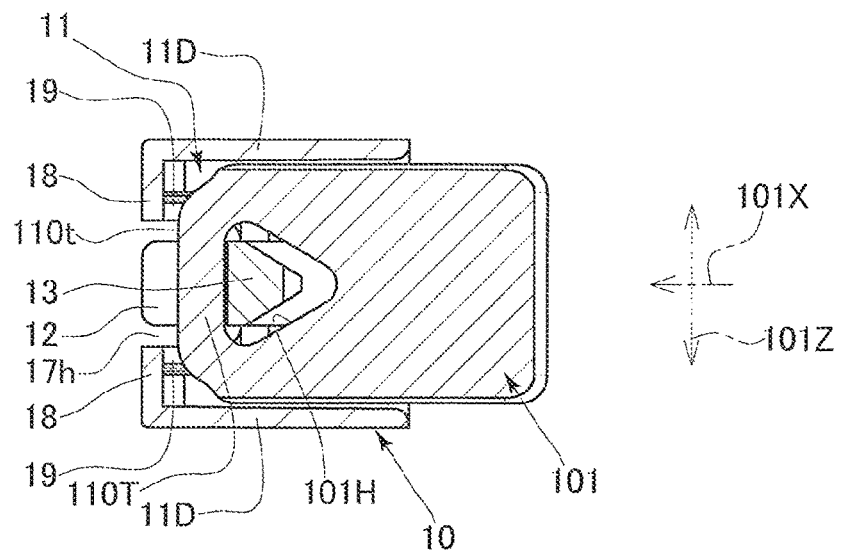
FIG. 14 is a cross-sectional view taken along a line XIV-XIV in FIG. 2.

The housing portion 11 has an upward movement regulation portion 18 that regulates further upward movement of the mounting tool 101 in the first engaging state. The upward movement regulation portion 18 of this embodiment is implemented as wall portions (above the grooves) disposed in the guiding wall portions 11E above the guiding grooves 11e so as to oppose the upper portion of the mounting tool 101 in the first engaging state, as shown in FIG. 14 (the left side represents the upper side, and the right side represents the lower side in FIG. 14). An upper end gap 19 is formed between the mounting tool 101 in the first engaging state, and the wall portion 18. When the mounting tool 101 is moved upward so as to elastically deform the upper side portion of the elastic portion 12, the mounting tool 101 needs to be moved upward over the end of the engaging claw portion 13. The position of the end of the engaging claw portion 13 of the elastic portion 12 in the deformed state, is higher than the position of the engaging claw portion 13 of the elastic portion 12 in the elastically restored state. Therefore, in order to allow the mounting tool 101 to be moved over the end of the engaging claw portion 13 positioned at the higher position, the mounting tool 101 needs to be moved to a position that is higher than a position at which the mounting tool 101 contacts with the engaging claw portion 13 (upper surface 13a) of the elastic portion 12 in the elastically restored state under the first engaging state (see FIG. 8). The upper end gap 19 is formed so as to allow this movement.

However, since the upper end gap 19 is provided, the mounting tool 101 in the first engaging state is movable upward, whereby instability may occur. However, since the pressing portion 200 is provided, even when the upper end gap 19 is provided, instability may not occur.

Figure 15:
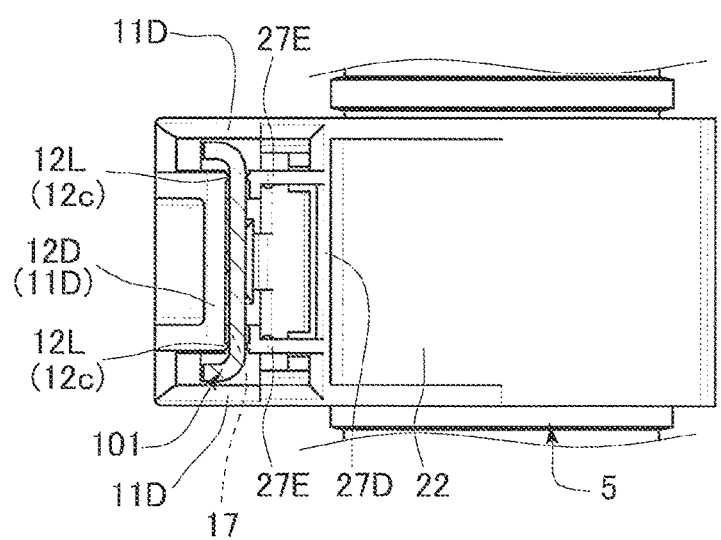
FIG. 15 is a cross-sectional view taken along a line XV-XV in FIG. 3.
Figure 16:
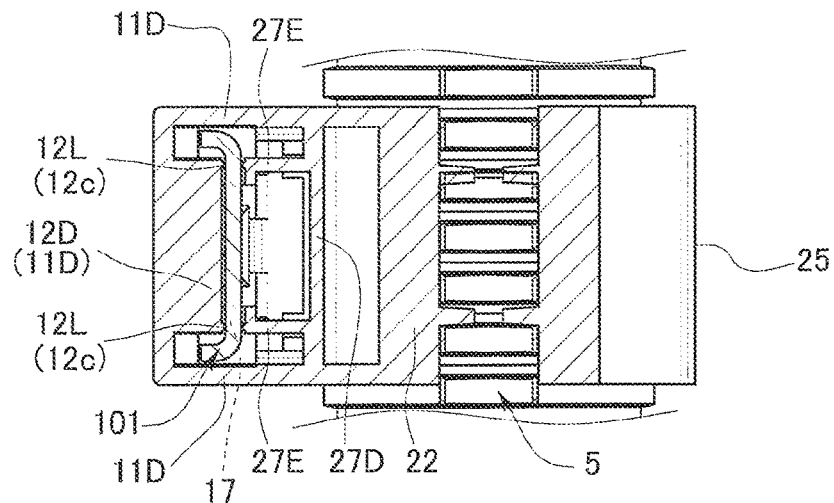
FIG. 16 is a cross-sectional view taken along a line XVI-XVI in FIG. 3.

Returning to FIG. 13, the space 127 is formed by the housing portion 11 and the housing portion 27, and communicates with the lower opening 11H therebelow. However, a gap 17 (see FIG. 16) having almost the same width as the mounting tool 101 is formed therebelow so as to allow the mounting tool 101 to enter on the housing portion 11 side, and the lower opening 11H is open at a position vertically below the gap 17 therebelow. That is, below the housing portion 27, as shown in FIG. 15 and FIG. 16, the side wall portions 27E, 27E are formed so as to project toward the housing portion 11, and the gap 17 and the lower opening 11H are formed on the housing portion 11 side relative to the space 127. Thus, entering of the mounting tool 101 into the housing portion 27 is regulated, and the mounting tool 101 can enter the housing portion 11 only.

Meanwhile, the space 127 communicates with the upper opening 24H on the upper side thereof, and the engagement portion 23 of this embodiment is configured to enter only the housing portion 27 along a predetermined arc-shaped trajectory. Therefore, the upper opening 24H is not only formed on the housing portion 27 side, but also formed so as to be open on the housing portion 11 side. Furthermore, since the engagement portion 23 of this embodiment has the pressing portion 200 that projects toward the housing portion 11, the upper opening 24H is formed so as to extend also on the housing portion 11 side and include an opening region 17h (see FIG. 14) into which the pressing portion 200 can enter from the upper side. However, since the wall portions 18 forming the upward movement regulation portion 18 as described above need to be provided on the housing portion 11 side as shown in FIG. 14, both the opening region 17h and the wall portions 18 are formed above the housing portion 11. In this embodiment, the wall portions 18 and 18 are formed on both sides of the opening region 17h so as to position the opening region 17h therebetween in a width direction 101Z, of the holding component 1 for a vehicle, orthogonal to both the entering direction 101X, and an aligning direction 120Y (see FIG. 4), orthogonal to the entering direction 101X, in which the fixing portion 10 and the holding portion 20 are aligned.

In this embodiment, the fixing portion 10 and the holding portion 20 are laterally aligned so as to be adjacent to each other. Further, in the aligning direction 120Y, the housing portion 11 of the fixing portion 10 and the housing portion 27 of the holding portion 20 are adjacent to each other. The elastic portions 12 and 26 oppose each other in the aligning direction 120Y. The engaging claw portions 13 and 29 of the elastic portions 12 and 26, respectively, project so as to be close to each other. The engaging claw portions 13 and 29 of the elastic portions 12 and 26, respectively, are elastically deformed so as to be apart from each other when the mounting tool 101 and the engagement portion 23 to be engaged enter (see FIG. 8 and FIG. 12). Further, the holding portion 20 in the second engaging state has the engagement portion 23 on the fixing portion 10 side, and has the hinge portion 25 on the opposite side in the aligning direction 120Y (see FIG. 4), as shown in FIG. 1 and FIG. 13.

Although the first embodiment of the invention has been described above, the embodiment is merely illustrative, the invention is not limited to the embodiment, and various modifications such as additions and omissions may be made based on the knowledge of a person skilled in the art without departing from the scope of the claims.

Hereinafter, modifications of the above-described embodiment and other embodiments will be described. It should be noted that portions having the same functions as those in the above-described embodiment are designated by the same reference characters and the detailed description thereof is omitted. In addition, the above-described embodiment and the following modifications and other embodiments may be combined to be implemented as appropriate as long as no technical contradiction arises.

Figure 17:
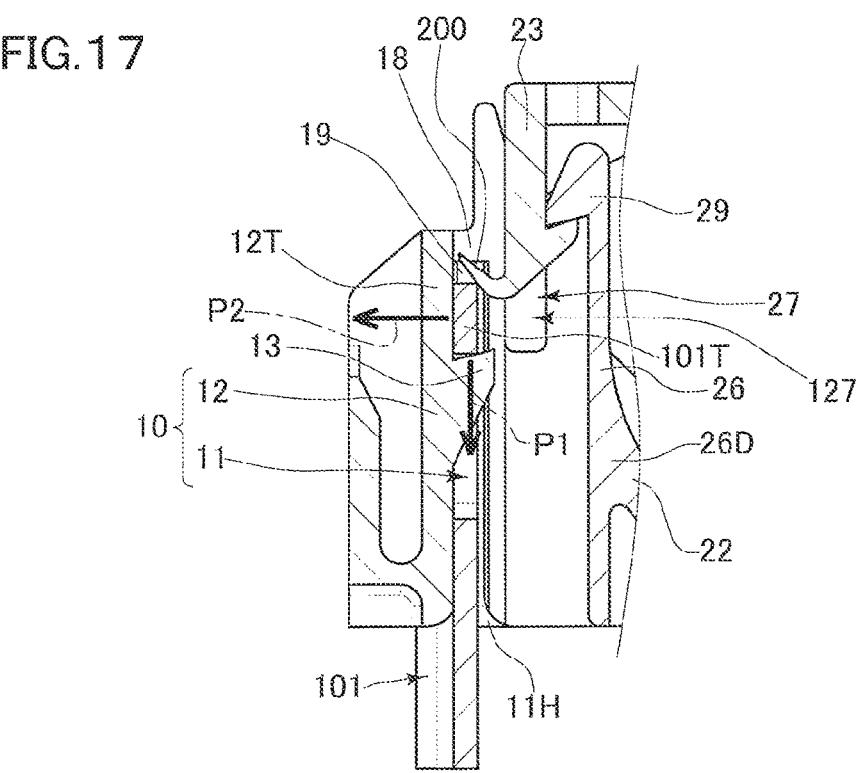
FIG. 17 illustrates, in the same cross-section as shown in FIG. 13, a modification of the holding component for a vehicle according to the first embodiment of this invention.

In the first embodiment, the pressing portion 200 may be positioned relative to the mounting tool 101 in the first engaging state such that the end of the pressing portion 200 is positioned above the upper end gap 19 described above in a state where the engagement portion 23 is in the second engaging state, as shown in FIG. 17. Thus, the pressing portion 200 can be assuredly pressed against the mounting tool 101 in the first engaging state, in the lower direction (P1) from the upper side.

Figure 18:
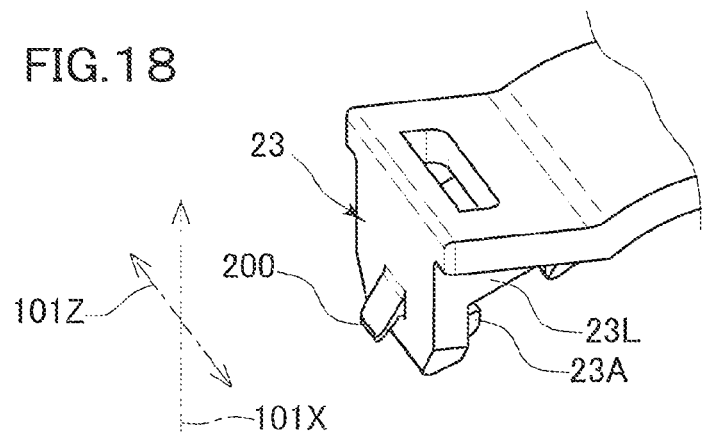
FIG. 18 is a perspective view of an engagement portion of a holding component for a vehicle according to a second embodiment of this invention.
Figure 19:
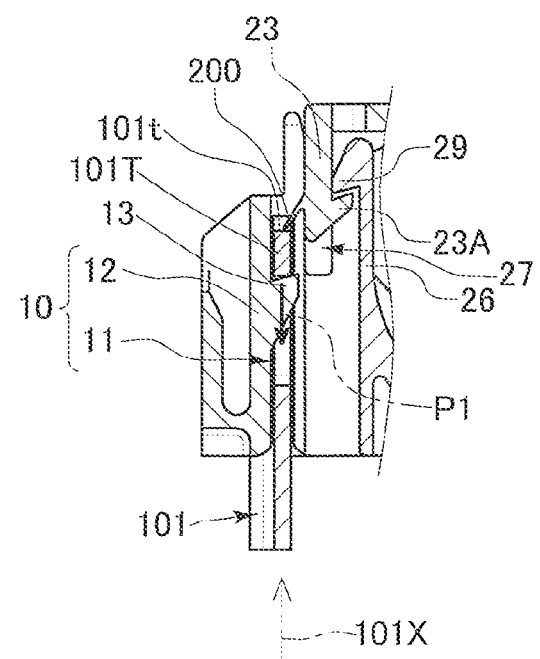
FIG. 19 illustrates, in the same cross-section as shown in FIG. 13, a second engaging state of the holding component for a vehicle according to the second embodiment of this invention.

FIG. 18 and FIG. 19 show a second embodiment of this invention.

In the second embodiment, the pressing portion 200 is formed so as to extend diagonally downward toward the elastic portion 12 from a position above the lower end of the engagement portion 23. The pressing portion 200 is elastically deformed such that the end side portion thereof is pressed back in the upper direction by the base end side portion serving as an originating point, and the end of the pressing portion 200 contacts with the upper end portion 101T (upper end surface 101t) of the mounting tool 101 to press the upper end portion 101T in the lower direction (P1).

Figure 20:
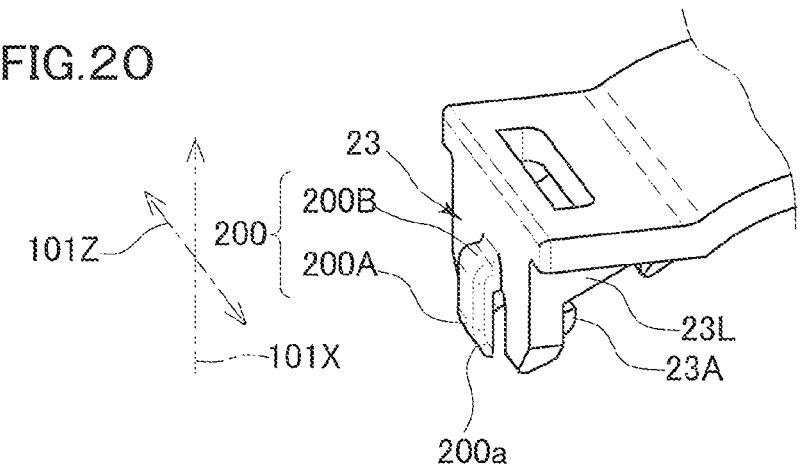
FIG. 20 is a perspective view of an engagement portion of a holding component for a vehicle according to a third embodiment of this invention.
Figure 21:
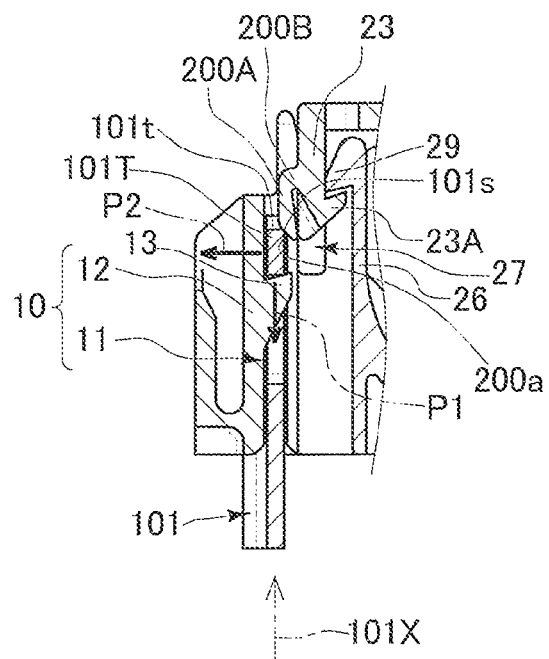
FIG. 21 illustrates, in the same cross-section as shown in FIG. 13, a second engaging state of the holding component for a vehicle according to the third embodiment of this invention.

FIG. 20 and FIG. 21 show a third embodiment of this invention.

In the third embodiment, the pressing portion 200 is formed so as to have an intermediate portion 200B and an end portion 200A. The intermediate portion 200B extends toward the elastic portion 12 from a position above the lower end of the engagement portion 23. The end portion 200A extends in the lower direction (a direction opposite to the entering direction 101X) from the end of the intermediate portion 200B that extends. A surface 200a of the end portion 200A in the pressing portion 200 on the elastic portion 12 side is formed, in a state where the pressing portion 200 is not elastically deformed as shown in FIG. 20, as such a tilted surface that, toward the end (lower end) of the surface 200a, the surface 200a is positioned so as to be closer to the projecting end side of the engaging claw portion 13, and, toward the upper side of the surface 200a, the surface 200a is positioned so as to be closer to the base end side of the engaging claw portion 13. In the pressing portion 200, the tilted surface 200a is brought into contact with an upper end corner portion 101s, closer to the projecting end side of the engaging claw portion 13, of the upper end portion 101T of the mounting tool 101, to press the mounting tool 101 in the lower direction (P1) and onto the base end side (P2) of the engaging claw portion 13. At this time, the pressing portion 200 is elastically deformed such that the end portion 200A is pressed back so as to be closer to the projecting end side of the engaging claw portion 13, as shown in FIG. 21.

Figure 22:
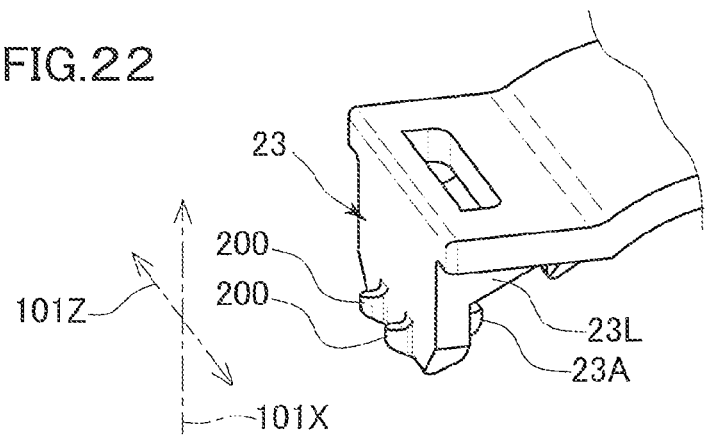
FIG. 22 is a perspective view of an engagement portion of a holding component for a vehicle according to a fourth embodiment of this invention.
Figure 23:
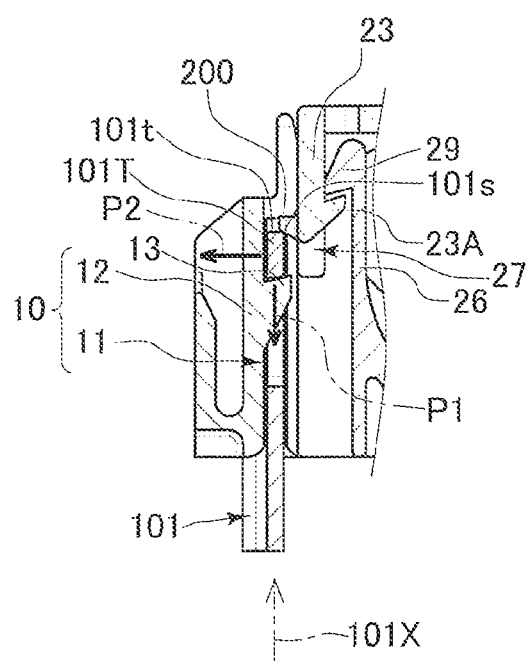
FIG. 23 illustrates, in the same cross-section as shown in FIG. 13, a second engaging state of the holding component for a vehicle according to the fourth embodiment of this invention.

FIG. 22 and FIG. 23 show a fourth embodiment of this invention.

In the fourth embodiment, the pressing portion 200 is formed, as a wedge portion that projects toward the elastic portion 12, on the lower side (in this embodiment, the lower end) of the engagement portion 23. In this embodiment, a plurality (two in this example) of wedge portions 200 are aligned in the width direction 101Z. The wedge portions 200 are brought into contact with and pressed onto the upper end corner portion 101s, closer to the projecting end side of the engaging claw portion 13, in the upper end portion 101T of the mounting tool 101, whereby the mounting tool 101 is pressed in the lower direction (P1) and onto the base end side (P2) of the engaging claw portion 13.

Figure 24:
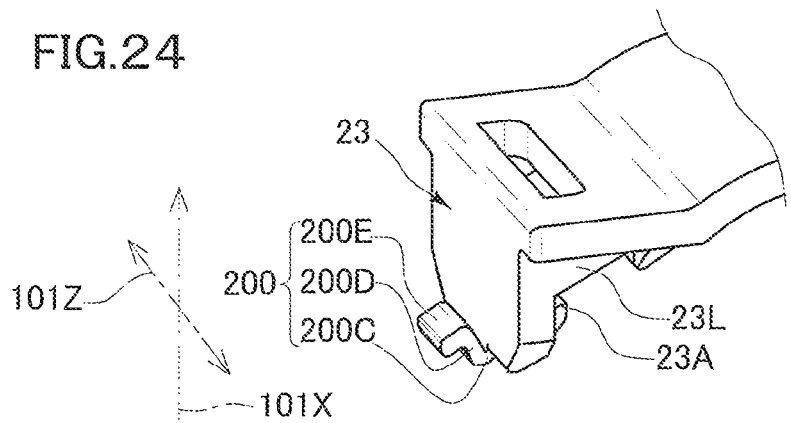
FIG. 24 is a perspective view of an engagement portion of a holding component for a vehicle according to a fifth embodiment of this invention.
Figure 25:
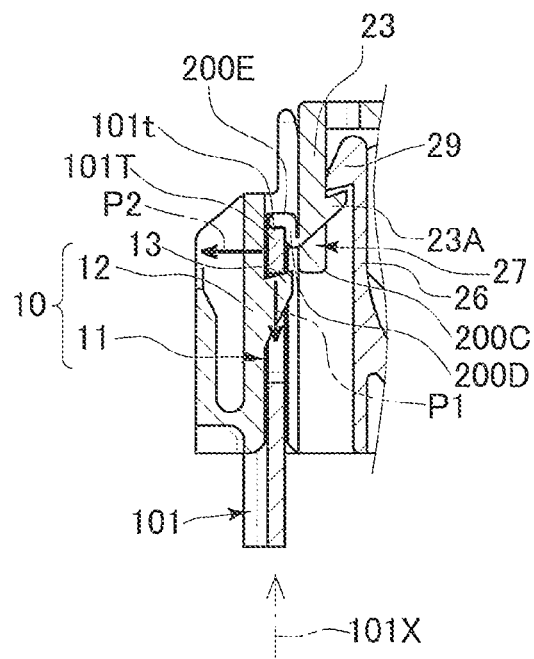
FIG. 25 illustrates, in the same cross-section as shown in FIG. 13, a second engaging state of the holding component for a vehicle according to the fifth embodiment of this invention.
Figure 26:
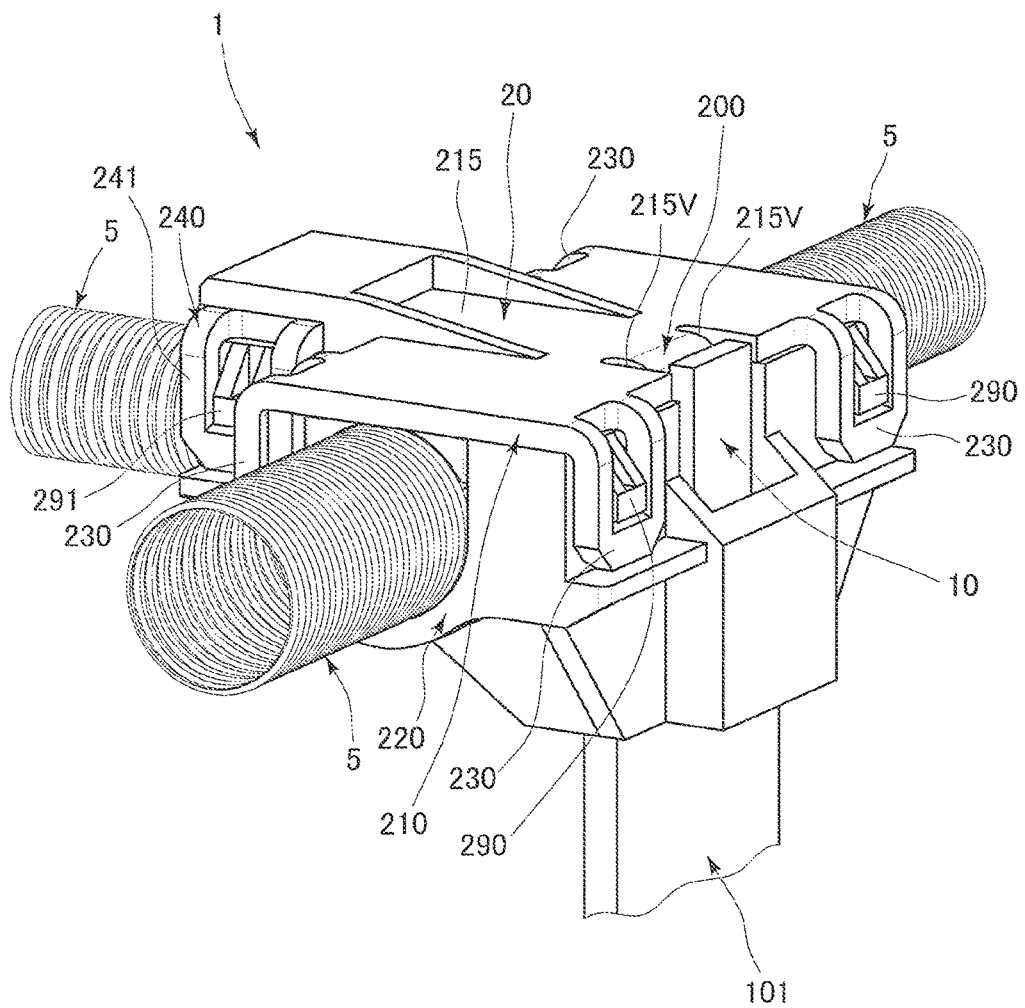
FIG. 26 is a perspective view illustrating a state where a predetermined member is held by a holding component for a vehicle according to a sixth embodiment of this invention.

FIG. 24 and FIG. 25 show a fifth embodiment of this invention.

In the fifth embodiment, the pressing portion 200 is formed so as to include: a base end side intermediate portion 200C that extends from the lower end of the engagement portion 23 toward the elastic portion 12; an end side intermediate portion 200D that is bent upward at the end of the base end side intermediate portion 200C; and an end portion 200E that extends toward the elastic portion 12 further from the end of the end side intermediate portion 200D. The pressing portion 200 is elastically deformable by the base end side intermediate portion 200C serving as an originating point such that the end side portions (200D, 200E) are made closer to the engagement portion 23. Due to this elastic deformation, in the pressing portion 200, the end side intermediate portion 200D is brought into contact with the mounting tool 101 from the projecting side of the engaging claw portion 13 at the upper end portion 101T of the mounting tool 101 to press the mounting tool 101 onto the base end side (P2) of the engaging claw portion 13. Meanwhile, the end portion 200E of the pressing portion 200 contacts with the upper end portion 101T (upper end surface 101t) of the mounting tool 101, to press the mounting tool 101 in the lower direction (P1).

In each of the embodiments, since the upper surface 13a of the engaging claw portion 13 is formed as the tilted surface as described above, when the mounting tool 101 is pressed downward by the pressing portion 200, the upper end portion 101T of the mounting tool 101 slides downward on the upper surface 13a, and is pressed against the corner portion 123 (see FIG. 13).

FIG. 26 to FIG. 35 show a sixth embodiment of this invention.

Figure 27:
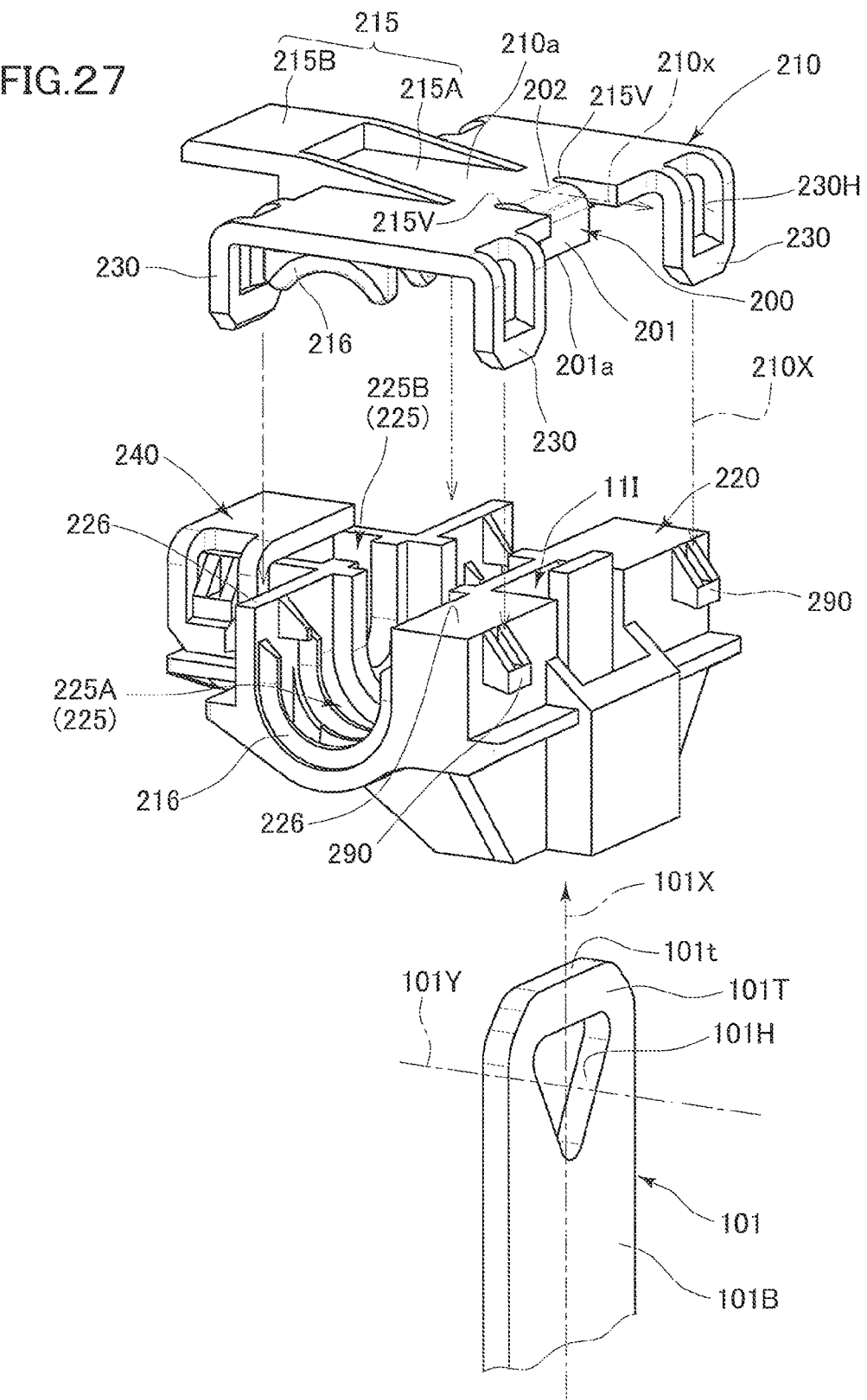
FIG. 27 is an exploded perspective view illustrating the state shown in FIG. 26.
Figure 28:
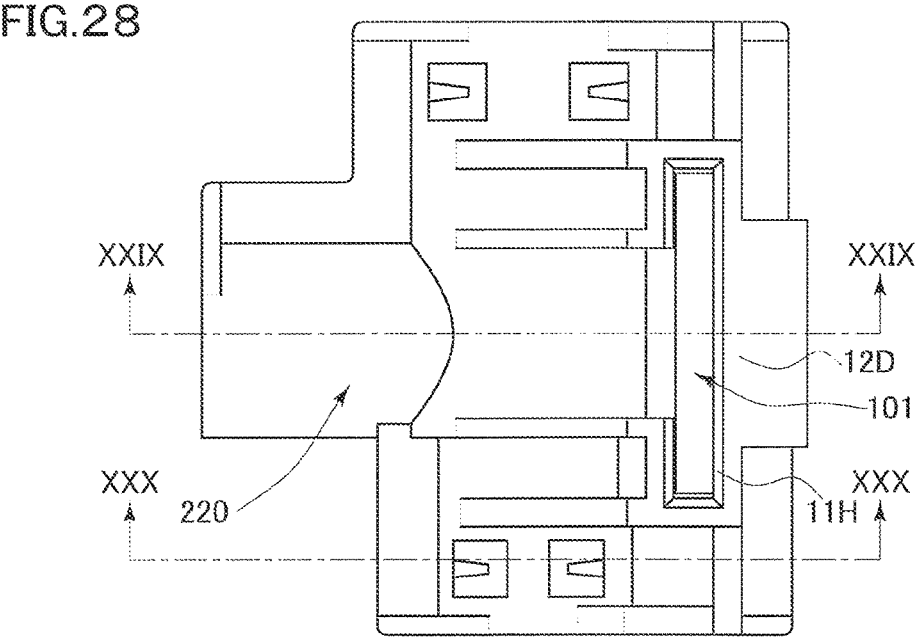
FIG. 28 is a bottom view illustrating the state shown in FIG. 26.

In the sixth embodiment, in the holding portion 20, the upper holding portion 21 and the lower holding portion 22 are not coupled to each other via the hinge portion 25, and, as shown in FIG. 27, the upper holding portion 210 and the lower holding portion 220 are separated from each other, unlike in the above embodiments. That is, in the sixth embodiment, the corrugated tube 5 is accommodated into the lower holding portion 220 from thereabove, and the upper holding portion 210 is engaged and combined with the lower holding portion 220 so as to cover the lower holding portion 220 in the accommodated state. In order to combine the upper holding portion 210 and the lower holding portion 220 with each other, the upper holding portion 210 has the engagement portions 230 formed so as to extend downward from three or more positions (four positions in this embodiment) on the outer periphery of the upper holding portion 210. Meanwhile, the lower holding portion 220 has engagement receiving portions 290 corresponding to the engagement portions 230, on the outer side of the outer periphery thereof.

Figure 30:
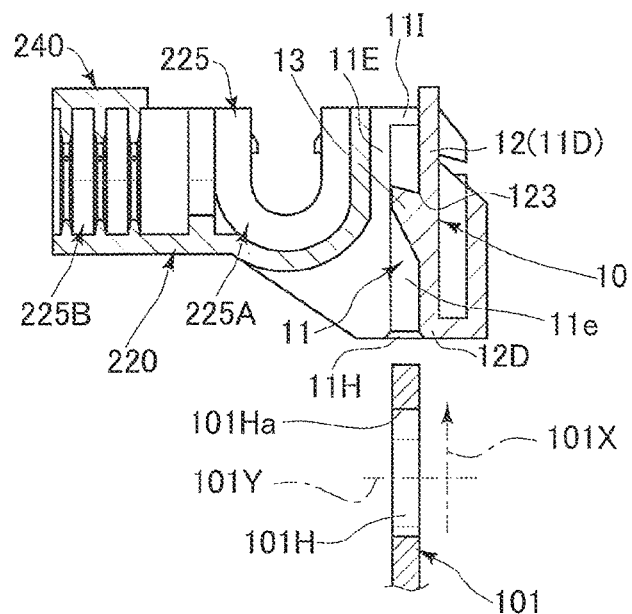
FIG. 30 illustrates, in a cross-section taken along the line XXIX-XXIX in FIG. 28, a first step of a process in which a mounting tool shown in FIG. 26 is housed so as to be fixed.
Figure 31:
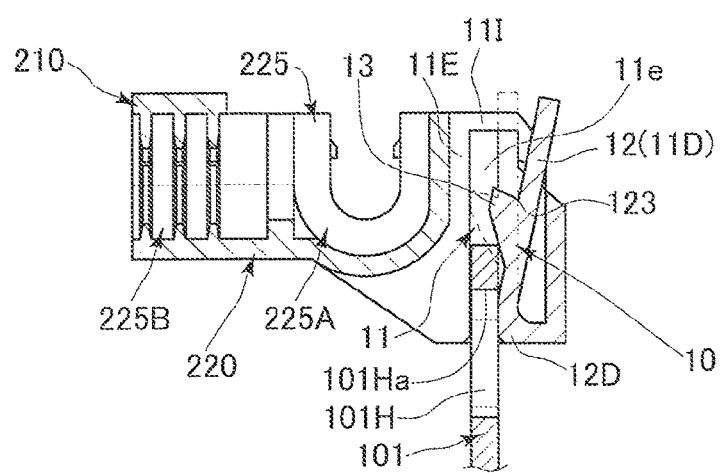
FIG. 31 illustrates, in the cross-section taken along the line XXIX-XXIX in FIG. 28, a second step of the process in which the mounting tool shown in FIG. 26 is housed so as to be fixed.
Figure 32:
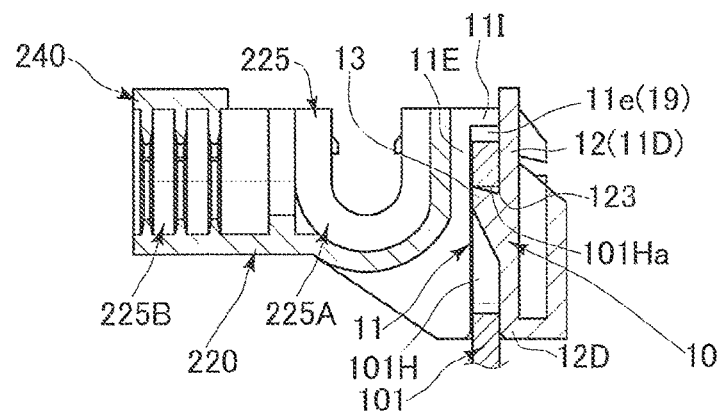
FIG. 32 illustrates, in the cross-section taken along the line XXIX-XXIX in FIG. 28, a third step of the process in which the mounting tool shown in FIG. 26 is housed so as to be fixed.

Further, in the sixth embodiment, the fixing portion 10 is formed as the first engagement housing portion 10 that provides the first engaging state in which the engaging claw portion 13 of the elastic portion 12 prevents removal of the mounting tool 101 that has entered from the lower side to be housed in the housing portion 11, as in the above embodiments. That is, as shown in FIG. 30, the elastic portion 12 prevents upward movement of the mounting tool 101 having been moved upward from the lower side to enter the housing portion 11, by the engaging claw portion 13 being brought into contact with the mounting tool 101. However, by the engaging claw portion 13 being further pressed by the mounting tool 101, the elastic portion 12 is elastically deformed by the lower-side portion (connection portion 12D) serving as an originating point, to allow the mounting tool 101 to be moved further upward, as shown in FIG. 31. The mounting tool 101 having been moved further upward, allows the elastic portion 12 to be elastically restored by the engaging claw portion 13 entering the engagement hole portion 101H, as shown in FIG. 32. Thus, the first engaging state is obtained in which, when the mounting tool 101 is moved in a direction opposite to the entering direction 101X, the engaging claw portion 13 having entered the engagement hole portion 101H contacts with (stops in an engaging manner on) the inner peripheral upper surface 101Ha of the engagement hole portion 101H, to prevent the movement.

Further, in the sixth embodiment, the holding portion 20 includes the upper holding portion 210, the lower holding portion 220, the engagement portions 230, the engagement receiving portions 290, and the pressing portion 200, as in the above embodiments. The engagement portions 230 are provided in the upper holding portion 210. The engagement receiving portions 290 are provided in the lower holding portion 220, and engage with the engagement portions 230 to provide the second engaging state in which the upper holding portion 210 and the lower holding portion 220 are combined with each other. The pressing portion 200 presses downward the mounting tool 101 in the first engaging state under the second engaging state, whereby the engaging claw portion 13 of the elastic portion 12 in the fixing portion 10 is held so as to be in contact with the inner peripheral upper surface 101Ha of the engagement hole portion 101H of the mounting tool 101.

The holding portion 20 of the sixth embodiment is different from the holding portion of the above embodiments in that the second engagement housing portion 24 as provided in the above embodiments is not provided in the sixth embodiment. That is, the holding portion 20 of the sixth embodiment has the engagement receiving portions 290 as engagement projecting portions that project outward from an outer surface of the lower holding portion 220 and are exposed to the outside, as shown in FIG. 27. The holding portion 20 of the sixth embodiment is not structured so as to house the engagement portion 230 in an internal space. Specifically, the lower holding portion 220 of the sixth embodiment has a positioning portion 225 in which the corrugated tube 5 entering from thereabove is accommodated, and the engagement receiving portions 290 project outward from upper end sides of the outer surfaces of the side surface wall portions 226, 226 that are disposed on both ends in the longitudinal direction of the positioning portion 225 (main positioning portion 225A described below) so as to hold, between the inner sides thereof, the corrugated tube 5 to be accommodated. Meanwhile, the upper holding portion 210 of the sixth embodiment includes: an upper surface portion 215 that covers the upper portion of the positioning portion 225; and the engagement portions 230 that are provided at positions corresponding to the engagement receiving portions 290, respectively, of the lower holding portion 220, extend outward from the outer periphery of the upper surface portion 215, and extend downward at the end of the outward extension.

Figure 33:
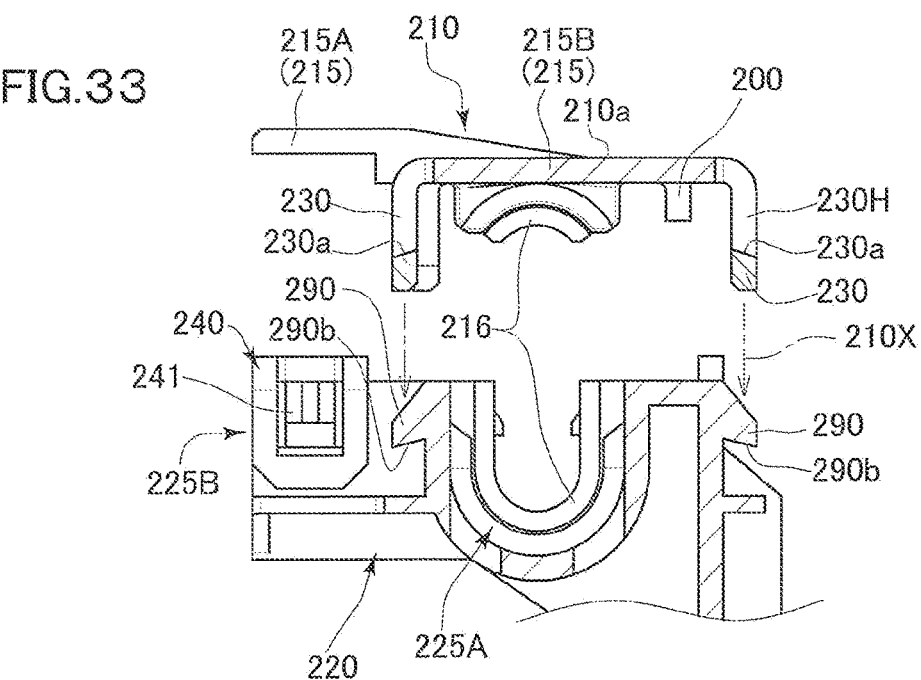
FIG. 33 illustrates, in a cross-section taken along a line XXX-XXX in FIG. 28, a first step of a process in which an engagement portion of a holding portion is engaged in a first engaging state shown in FIG. 32.
Figure 34:
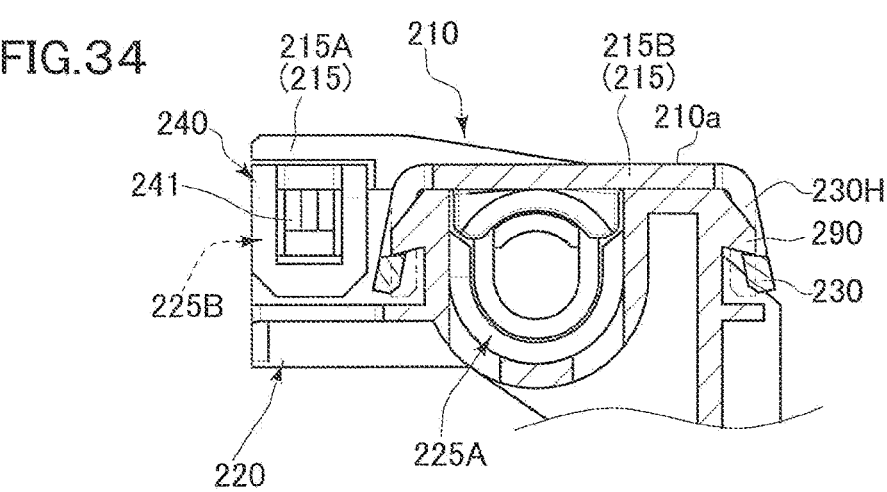
FIG. 34 illustrates, in the cross-section taken along the line XXX-XXX in FIG. 28, a second step of the process in which the engagement portion of the holding portion is engaged in the first engaging state shown in FIG. 32.
Figure 35:
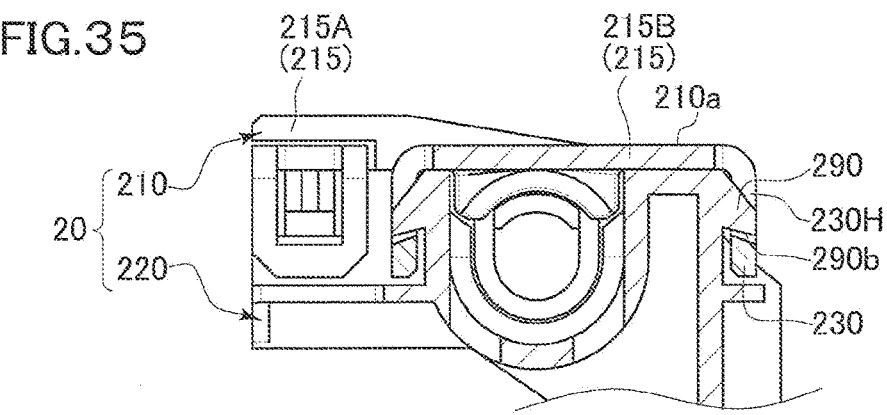
FIG. 35 illustrates, in the cross-section taken along the line XXX-XXX in FIG. 28, a third step of the process in which the engagement portion of the holding portion is engaged in the first engaging state shown in FIG. 32.

Each engagement portion 230 of the sixth embodiment is an elastic portion that has a downward extending end side portion which can be elastically deformed outward by the base end side portion extending outward from the outer periphery serving as an originating point, and that has, at the center portion, an engagement hole portion 230H that penetrates between the inside and outside thereof. The upper holding portion 210 is combined with the lower holding portion 220 such that the plurality of engagement portions 230 are pressed toward the corresponding engagement receiving portions 290, respectively, as shown in FIG. 33. At this time, each engagement portion 230 contacts, with the corresponding engagement receiving portion 290 that projects outward, from above the engagement receiving portion 29, and is prevented from entering. However, the engagement portion 230 is further pressed, whereby the engagement portion 230 is elastically deformed by the base end side portion serving as an originating point, as shown in FIG. 34, and the upper holding portion 210 is moved much closer to the lower holding portion 220. In the upper holding portion 210 having been moved much closer thereto, as shown in FIG. 35, the engagement portion 230 is elastically restored by the projecting engagement receiving portion 290 entering the engagement hole portion 230H from the inner side. Thus, the engagement receiving portions 290 having entered the engagement hole portions 230H are brought into the second engaging state in which, when the upper holding portion 210 is moved in a direction opposite to a combining direction 210X, the upper holding portion 210 contacts with (stops in an engaging manner on) lower surfaces 290b of the projecting engagement receiving portions 290, to prevent the movement.

Figure 29:
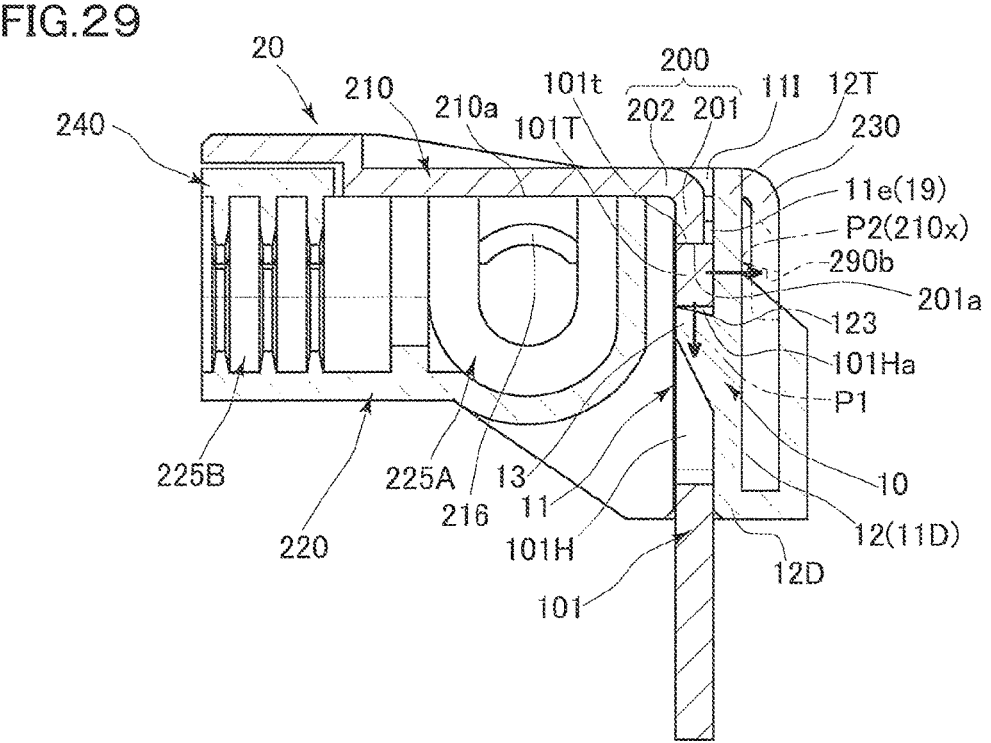
FIG. 29 is a cross-sectional view taken along a line XXIX-XXIX in FIG. 28, illustrating a second engaging state of the holding component for a vehicle according to the sixth embodiment of this invention.

The pressing portion 200 of the sixth embodiment is provided in the upper holding portion 210 at a position other than positions in the engagement portion 230, unlike in the above embodiments. Furthermore, the sixth embodiment is different from the other embodiments in that, in the sixth embodiment, the housing portion 11 for housing the mounting tool 101 and the housing portion 27 for housing the engagement portion 23 of the upper holding portion 210 do not form a common space by the housing portion 11 and the housing portion 27 being laterally aligned to communicate with each other. In the sixth embodiment, as shown in FIG. 29, the pressing portion 200 that is formed, in the upper holding portion 210, separately from the engagement portion 23 is moved through an upper opening 11I and housed in the housing portion 11 for housing the mounting tool 101. The upper opening 11I corresponds to a portion denoted by the reference numeral 17h (see FIG. 14) in the embodiments described above.

Specifically, the pressing portion 200 of the sixth embodiment includes a projection base end portion 202 and a projection end portion 201, as shown in FIG. 27 and FIG. 29. The projection base end portion 202 projects, in one extending direction in which an upper surface 210a extends, from the upper surface portion 215 forming the upper surface 210a of the upper holding portion 210. The projection end portion 201 extends downward from the end of the projection base end portion 202. The pressing portion 200 presses downward the mounting tool 101 in the first engaging state by the projection end portion 201 when the second engaging state is obtained. The pressing portion 200 has cut portions 215V, 215V obtained by the upper surface portion 215 being cut in a direction opposite to the projecting direction 210x. The cut portions 215V, 215V are formed, in the upper surface portion 215, on both end sides, in the width direction orthogonal to the projecting direction 210x, of the projection base end portion 202.

When the mounting tool 101 in the first engaging state is pressed downward under the second engaging state, the cut portions 215V, 215V allow the pressing portion 200 of the sixth embodiment to be elastically deformed upward by the base end side portion serving as an originating point, to urge the mounting tool 101 downward and maintain the mounting tool 101 in the urged state. That is, the pressing portion 200 continues to press downward the mounting tool 101 in the first engaging state when the second engaging state is obtained. Thus, the engaging claw portion 13 of the fixing portion 10 is maintained so as to contact with (stop in an engaging manner on) the inner peripheral upper surface 101Ha of the engagement hole portion 101H of the mounting tool 101, to prevent instability. On the contrary, pressing the mounting tool 101 downward by the pressing portion 200 causes the engagement portions 230 to be pressed upward, and contributes to maintaining of the second engaging state in which the engagement portions 230 and the engagement receiving portions 290 contact with (stop in an engaging manner on) each other, thereby maintaining a stable engaged state without instability.

Specifically, the pressing portion 200 of the sixth embodiment has an extending plate-like shape, and has a projecting end that is bent downward. When the second engaging state is obtained, as shown in FIG. 29, an end surface 201a of the pressing portion 200 is brought into contact with the upper end portion 101T (upper end surface 101t) of the mounting tool 101 in the first engaging state, from thereabove. At this time, the mounting tool 101 is pressed, by the pressing portion 200, in both the lower direction P1 and the direction 210x (P2) opposite to the projecting direction of the engaging claw portion 13, and is accommodated in the corner portion 123 formed by the upper end portion 12T and the engaging claw portion 13 of the elastic portion 12. In this state, stability is obtained without generating instability in both the up-down direction, and the inward-outward direction orthogonal to the up-down direction. Force in P2 acts because the upper surface of the engaging claw portion 13 that contacts with the inner peripheral upper surface 101Ha of the engagement hole portion 101H of the mounting tool 101, is formed as a tilted surface that is tilted downward from the end thereof toward the corner portion 123 (in the P2 direction).

The pressing portion 200 of the sixth embodiment is formed in a mid-position between the engagement portions 230 and 230 that are adjacent to each other in the longitudinal direction of the positioning portion 225 (the main positioning portion 225A described below) in the lower holding portion 220. Thus, the pressing portion 200 is elastically deformed so as to be supported by both the engagement portions 230 and 230 adjacent to each other in a well-balanced manner.

The positioning portion 225 of the sixth embodiment has such a U-shaped cross-section that the lower-side portion and both side surfaces of the corrugated tube 5 to be accommodated are covered, and the upper portion of the corrugated tube 5 is open, as shown in FIG. 27. In this embodiment, the positioning portion 225 has the main positioning portion 225A and a branched positioning portion 225B, to be formed into a T-shape. The main positioning portion 225A linearly connects two branched openings to each other. The branched positioning portion 225B is branched in the orthogonal direction at a mid-position, in the longitudinal direction, of the main positioning portion 225A. Thus, the predetermined member 5 can be linearly disposed, and can be also disposed so as to be branched at the mid-position. Specifically, in the positioning portion 225 of this embodiment, the corrugated tube 5 that has the same branched shape (in this embodiment, the shape that is branched so as to form T-shape) as the positioning portion 225 is disposed, or the corrugated tubes 5 having a linear shape are disposed at necessary portions on the branched opening sides.

In the positioning portion 225 of the sixth embodiment, as shown in FIG. 27, a semi-circular projection 216 is formed so as to fit into a recessed groove formed in the outer surface of the corrugated tube 5. The corrugated tube 5 is disposed in the positioning portion 225 so as to fit its recess to the projection 216, thereby regulating movement of the corrugated tube 5 in its projecting direction (axial direction). Further, the projection 216 is formed also in the upper surface portion 215 of the upper holding portion 210 so as to fit into the recess of the corrugated tube 5. However, in the upper holding portion 210, the projection 216 is formed merely in a main upper surface portion 215A, and, on the branched side, the projection 216 is formed in an auxiliary holding portion 240.

The auxiliary holding portion 240 for preventing the disposed corrugated tube 5 from being removed upward is combined with the branched positioning portion 225B, as shown in FIG. 27. Further, the upper side of the auxiliary holding portion 240 is covered by a branched-side upper surface portion 215B provided in the upper surface portion 215 of the upper holding portion 210. The branched-side upper surface portion 215B of this embodiment is formed as a plate-like portion that projects in the branch direction from the main upper surface portion 215A that covers the upper side of the main positioning portion 225A.

DESCRIPTION OF THE REFERENCE CHARACTERS 1 holding component for vehicle
5 predetermined member
10 fixing portion (first engagement housing portion)
11 housing portion
11H lower opening
12 elastic portion
13 engaging claw portion
20 holding portion
21 upper holding portion
22 lower holding portion
23 engagement portion
24 second engagement housing portion
24H upper opening
25 hinge portion
26 elastic portion
27 housing portion
200 pressing portion

What is claimed is:
1. A holding component for a vehicle, the holding component comprising: a fixing portion to which a mounting tool to be mounted to a vehicle body is fixed; and a holding portion for detachably holding a predetermined member, wherein
the fixing portion includes
a mounting tool housing portion configured to house the mounting tool that has been moved upward through a lower opening, and
an elastic portion configured: to have, on an upper-side portion, an engaging claw portion that projects inward in the mounting tool housing portion such that the engaging claw portion is pressed from thereunder by the mounting tool entering so as to be moved upward through the lower opening; to allow the mounting tool to be moved further upward by the elastic portion being elastically deformed by a lower-side portion serving as an originating point due to the engaging claw portion being pressed; and to allow the engaging claw portion to enter an engagement hole portion of the mounting tool by the elastic portion being elastically restored when the mounting tool is moved further upward and the engagement hole portion of the mounting tool reaches a position of the engaging claw portion, to provide a first engaging state in which the engaging claw portion having entered contacts with an inner peripheral upper surface of the engagement hole portion to prevent the mounting tool from being removed downward, and
the holding portion includes:
an upper holding portion disposed above the predetermined member;
a lower holding portion disposed below the predetermined member;
an engagement portion provided in the upper holding portion;
an engagement receiving portion, provided in the lower holding portion, configured to provide a second engaging state in which the engagement receiving portion engages with the engagement portion to combine the upper holding portion and the lower holding portion with each other; and a pressing portion configured to press the mounting tool in the first engaging state downward under the second engaging state, and hold the engaging claw portion in such a state that the engaging claw portion contacts with the inner peripheral upper surface of the engagement hole portion.

2. The holding component for a vehicle according to claim 1, wherein the engagement receiving portion is provided in an engagement housing portion, of the lower holding portion, adjacent to the mounting tool housing portion, and the engagement receiving portion engages with the engagement portion that is moved downward through an upper opening of the engagement housing portion, and housed, to provide the second engaging state, and the pressing portion is provided in the engagement portion, and presses downward the mounting tool in the first engaging state according to the second engaging state being obtained.

3. The holding component for a vehicle according to claim 2, wherein an internal space of the mounting tool housing portion and an internal space of the engagement housing portion communicate with each other, and the elastic portion forming a wall portion of the mounting tool housing portion is positioned on a first side in a direction orthogonal to an entering direction in which the mounting tool enters, and a wall portion of the engagement housing portion that engages with the engagement portion is positioned on a second side.

4. The holding component for a vehicle according to claim 3, wherein the pressing portion is an elastic piece that extends diagonally upward from a lower end of the engagement portion in a direction opposite to a direction in which the engaging claw portion of the elastic portion projects, and when the pressing portion presses the mounting tool in the first engaging state downward under the second engaging state, the pressing portion is elastically deformed such that an end side portion thereof is pressed in the direction in which the engaging claw portion projects.

5. The holding component for a vehicle according to claim 2, wherein an internal space of the mounting tool housing portion and an internal space of the engagement housing portion communicate with each other, the elastic portion forming a wall portion of the mounting tool housing portion is positioned on a first side in a direction orthogonal to an entering direction in which the mounting tool enters, and a wall portion of the engagement housing portion in which the engagement receiving portion is formed is positioned on a second side so as to oppose the elastic portion, and the pressing portion is formed so as to project from the engagement portion such that the pressing portion extends toward the mounting tool housing portion from the engagement portion that has entered the engagement housing portion.

6. The holding component for a vehicle according to claim 5, wherein the pressing portion is an elastic piece that extends diagonally upward from a lower end of the engagement portion in a direction opposite to a direction in which the engaging claw portion of the elastic portion projects, and when the pressing portion presses the mounting tool in the first engaging state downward under the second engaging state, the pressing portion is elastically deformed such that an end side portion thereof is pressed in the direction in which the engaging claw portion projects.

7. The holding component for a vehicle according to claim 1, wherein the pressing portion is provided in the upper holding portion at a position other than positions in the engagement portion, and the pressing portion is moved downward through an upper opening of the mounting tool housing portion to enter the mounting tool housing portion when the second engaging state is to be obtained, and the pressing portion presses the mounting tool in the first engaging state downward when the second engaging state is obtained.

8. The holding component for a vehicle according to claim 7, wherein the pressing portion includes a projection base end portion and a projection end portion, the projection base end portion projects, from an upper surface portion forming an upper surface of the upper holding portion, in one extending direction in which the upper surface extends, and the projection base end portion has cut portions obtained by the upper surface portion being cut in the upper surface in a direction opposite to a projecting direction in which the projection base end portion projects, on both end sides in a width direction orthogonal to the projecting direction, the projection end portion extends downward from an end of the projection base end portion, and the pressing portion presses downward the mounting tool in the first engaging state with the projection end portion when the second engaging state is obtained.

9. The holding component for a vehicle according to claim 8, wherein the number of the engagement portions formed is at least two, and the pressing portion is formed between two adjacent engagement portions among the at least two engagement portions.

10. The holding component for a vehicle according to claim 7, wherein the number of the engagement portions formed is at least two, and the pressing portion is formed between two adjacent engagement portions among the at least two engagement portions.

11. The holding component for a vehicle according to any one of claims 1, wherein the upper holding portion and the lower holding portion are coupled to each other via a hinge portion.

12. The holding component for a vehicle according to any one of claims 1, wherein the upper holding portion and the lower holding portion are formed separately from each other.

* * * * *